United States Patent
Mélinand et al.

(10) Patent No.: US 10,417,491 B2
(45) Date of Patent: Sep. 17, 2019

(54) SYSTEM AND METHOD FOR RECOGNITION OF HANDWRITTEN DIAGRAM CONNECTORS

(71) Applicant: MyScript, Nantes (FR)

(72) Inventors: Robin Mélinand, Nantes (FR); Romain Bednarowicz, Nantes (FR); Claire Sidoli, Nantes (FR); Fabien Ric, Nantes (FR); Anne Bonnaud, Nantes (FR)

(73) Assignee: MyScript, Nantes (FR)

( * ) Notice: Subject to any disclaimer, the term of this patent is extended or adjusted under 35 U.S.C. 154(b) by 0 days.

(21) Appl. No.: 14/955,174

(22) Filed: Dec. 1, 2015

(65) Prior Publication Data

US 2017/0109579 A1    Apr. 20, 2017

(30) Foreign Application Priority Data

Oct. 19, 2015    (EP) .................................... 15290269

(51) Int. Cl.
*G06K 9/00* (2006.01)
*G06K 9/46* (2006.01)
(Continued)

(52) U.S. Cl.
CPC ..... *G06K 9/00476* (2013.01); *G06K 9/00422* (2013.01); *G06K 9/2081* (2013.01); *G06K 9/222* (2013.01); *G06K 9/4638* (2013.01)

(58) Field of Classification Search
CPC .............. G06F 3/0488; G06K 9/00422; G06K 9/00476; G06K 9/222; G06K 9/4638
(Continued)

(56) References Cited

U.S. PATENT DOCUMENTS 5,867,596 A    2/1999   Kano et al.
6,525,749 B1   2/2003   Moran et al.
(Continued)

FOREIGN PATENT DOCUMENTS

EP   1973063       1/2011
WO   2009117810    10/2009

OTHER PUBLICATIONS

International Search Report for Related Application No. PCT/EP2016/001722, dated Oct. 18, 2016, EPO—International, WPI Data.

(Continued)

*Primary Examiner* — Manuchehr Rahmjoo
(74) *Attorney, Agent, or Firm* — McDermott Will & Emery LLP

(57) ABSTRACT

A system, method and computer program product for hand-drawing diagrams including text and non-text elements on a computing device are provided. The computing device has a processor and a non-transitory computer readable medium for detecting and recognizing hand-drawing diagram element input under control of the processor. Display of a plurality of input diagram elements in interactive ink is performed on a display device associated with the computing device. At least one diagram element is identified as a connector which connects a plurality of diagram elements. Geometrical characteristics of the at least identified connector are determined and the diagram elements are re-displayed based on one or more interactions received with the interactive ink of the at least identified connector or one or more of the plurality of diagram elements connected thereby and in accordance with the determined geometrical characteristics.

21 Claims, 19 Drawing Sheets

(51) Int. Cl.
    *G06K 9/22*     (2006.01)
    *G06K 9/20*     (2006.01)

(58) Field of Classification Search
    USPC .......................................................... 382/198
    See application file for complete search history.

(56) References Cited

U.S. PATENT DOCUMENTS

| | | |
|---|---|---|
| 7,324,691 B2 | 1/2008 | Li et al. |
| 7,330,184 B2 | 2/2008 | Leung |
| 7,352,902 B2 | 4/2008 | Li et al. |
| 7,400,771 B2 | 7/2008 | Li et al. |
| 7,904,810 B2 | 3/2011 | Chen et al. |
| 2014/0313216 A1 | 10/2014 | Steingrimsson |

OTHER PUBLICATIONS

"Gesture-Based Input for Drawing Schematics on a Mobile Device", Jul. 13, 2011, Daniel Chivers et al., 2011 15th International Conference on Information Visualisation.

"SketchNode: Intelligent sketching support and formal diagramming", Nov. 22, 2010, Beryl Plimmer et al.

"Combining Sketching and Traditional Diagram Editing Tools", Mar. 11, 2015, Gem Stapleton et al., ACM Transactions on Intelligent Systems and Technology (TIST).

"PDA-based graphical interchange for field service and repair workers", Sep. 1, 1996, Wayne V. Citrin et al., Computers and Graphics, Elsevier Science Ltd.

"Freeform digital ink annotations in electronic documents: A systematic mapping study", Nov. 6, 2015, Craig J. Sutherland et al., Computers & Graphics, Elsevier Ltd.

SYSTEM AND METHOD FOR RECOGNITION OF HANDWRITTEN DIAGRAM CONNECTORS

CROSS-REFERENCE TO RELATED APPLICATIONS

This application claims priority to European Application No. 15290269.8 filed on Oct. 19, 2015, the entire contents of which is incorporated by reference herein.

TECHNICAL FIELD

The present invention relates generally to the field of computing device interfaces capable of recognizing user input handwriting of various shapes and characters. In particular, the present invention provides systems and methods for handling editing operations effecting display of connectors between input handwritten diagram elements.

BACKGROUND

Computing devices continue to become more ubiquitous to daily life. They take the form of computer desktops, laptop computers, tablet computers, e-book readers, mobile phones, smartphones, wearable computers, global positioning system (GPS) units, enterprise digital assistants (EDAs), personal digital assistants (PDAs), game consoles, and the like. Further, computing devices are being incorporated into vehicles and equipment, such as cars, trucks, farm equipment, manufacturing equipment, building environment control (e.g., lighting, HVAC), and home and commercial appliances.

Computing devices generally consist of at least one processing element, such as a central processing unit (CPU), some form of memory, and input and output devices. The variety of computing devices and their subsequent uses necessitate a variety of interfaces and input devices. One such input device is a touch sensitive surface such as a touch screen or touch pad wherein user input is received through contact between the user's finger or an instrument such as a pen or stylus and the touch sensitive surface. Another input device is an input surface that senses gestures made by a user above the input surface. A further input device is a position detection system which detects the relative position of either touch or non-touch interactions with a non-touch surface. Any of these methods of input can be used generally for the handwritten or hand-drawn input of drawings and text which input is interpreted using a handwriting recognition system or method.

One application of handwriting recognition in computing devices is in the creation of diagrams which are hand-drawn on a computing device to be converted into typeset versions. Diagrams are drawings that explain or show arrangement and relations (as of parts). Diagrams generally include shapes having arbitrary or specific meanings and text with relationships to these shapes. There are many type of diagrams, such as flowcharts, organizational charts, concept maps, spider maps, block/architecture diagrams, mind-maps, block diagrams, Venn diagrams and pyramids. Depictions of some typeset and handwritten examples of possible diagrams are illustrated in FIGS. 1 to 6.

FIGS. 1A and 1B respectively show typeset and handwritten example concept maps 10 variously having shapes, defining diagram blocks or containers 12 and connectors 14, of different type (e.g., straight arrows, curved arrows), which connect or designate relationships between the diagram blocks 12. Further, in FIG. 1B the containers 12 contain text 16. Generally in concept maps the connections between the blocks define conceptually related or dependent elements or themes defined by the text in those blocks. The blocks themselves may not be present in the concept map and instead the text (e.g., defined in text blocks having no associated shape or container) may be connected by the connectors.

FIGS. 2A and 2B respectively show typeset and handwritten example mind-maps 20 variously having shapes defining diagram blocks or containers 12, connectors 14, of different type (e.g., straight lines, curved lines), which connect or designate relationships between the diagram blocks 12 and paths 18 to certain features or states of the mind maps. Further, in FIG. 2B the containers 12 and paths 18 have associated text 16. Generally in mind-maps the connections between the blocks define possible alternative states from central elements or themes defined by the text in those blocks, and the paths define key features of each alternative state defined by the text on those paths. The blocks themselves may not be present in the mind map and instead the text (e.g., defined in text blocks having no associated shape or container) may be connected by the connectors and paths.

FIGS. 3A and 3B respectively show typeset and handwritten example flow charts or diagrams 30 variously having shapes, defining diagram blocks or containers 12, of different type (e.g., ovals, rectangles, diamonds), and connectors 14, of different type (e.g., straight arrows, bent arrows, branched lines), which connect or designate relationships between the diagram blocks 12. Further, in FIG. 3B the containers 12 contain text 16; text may also be associated with the connectors. Generally in flow charts the connections between the blocks define procedurally related or dependent elements or steps defined by the text in those blocks. The blocks themselves may not be present in the flow chart and instead the text (e.g., defined in text blocks having no associated shape or container) may be connected by the connectors.

FIGS. 4A and 4B respectively show typeset and handwritten example organizational charts or diagrams 40 variously having shapes, defining diagram blocks or containers 12, and connectors 14, of different type (e.g., straight lines, bent lines, branched lines), which connect or designate relationships between the diagram blocks 12. Further, in FIG. 4B the containers 12 contain text 16. Generally in organizational charts the connections between the blocks define hierarchical relationships of members or functions of an organization or group defined by the text in those blocks. The blocks themselves may not be present in the organizational chart and instead the text (e.g., defined in text blocks having no associated shape or container) may be connected by the connectors.

FIGS. 5A and 5B respectively show typeset and handwritten example block/architecture drawings 50 variously having shapes, defining diagram blocks or containers 12, having nested relationships (e.g., containers 12 within other containers 12), and connectors 14 which connect or designate relationships between the diagram blocks 12, including between nested blocks. Further, in FIG. 5B the containers 12 and connectors have associated text 16. Generally in architecture drawings the nested blocks define arrangement or possession of device or process components, and the connections between the blocks define functional relationships between the blocks defined by the text in those blocks.

FIGS. 6A and 6B respectively show typeset and handwritten example spider maps 60 variously having shapes, defining diagram blocks or containers 12 and connectors 14 which connect or designate relationships between the diagram blocks 12. Further, in FIG. 6B the containers 12 and connectors have associated text 16. Generally in spider maps the connections between the blocks and/or text define dependent relationships or states from a central element or theme defined by the text.

The diagrams illustrated in FIGS. 1 to 6 are merely examples and other or different elements than those depicted for each diagram type, or different types or forms of the depicted elements themselves, may be present in the diagrams in addition or in the alternative. Further, other definitions of these diagram types are possible as well as combinations thereof. These myriad possible variations of combining the base components of shapes (connections with or without containers) and text in diagrams can cause issues for the accurate recognition of these elements input as hand-drawn or written content to a computing device. Diagrams are particularly used in education and business settings where the user of the computing device creates a diagram, for example, during a lecture or meeting to capture concepts, issues or solutions being discussed. This is usually done by the user launching a handwritten diagram or sketch application on the computing device which accepts and interprets, either locally in the device or remotely via a communications link of the device, hand-drawn input on a touch sensitive surface or a surface monitored by a relative position detection system.

Conventionally such handwritten diagramming applications are limited in their capabilities to handle the above-described complexity of diagramming and typically constrain users to adopt behaviors or accept compromises which do not reflect the user's original intent. As a result some conventional handwritten diagramming applications force users to navigate menus to select and draw shapes and insert text in relation to shapes. As such, users are unable to draw shapes and connectors naturally or freely. Some conventional applications recognize hand-drawn shapes and handwritten text well with reasonable creative freedom offered to users. However, the ability to change the drawn diagrams, such as to edit elements of the diagram to add, omit or replace elements, adapt the diagram to an evolving concept, convert the type of diagram, etc., is limited where only certain operations are available and only available on the typeset version of the diagram, especially with respect to manipulations of the relative positions of diagram elements while retaining recognized relationships, such as connected containers, for example, and not on the handwritten input, so-called digital ink, and/or requires gestures to be learnt or selection to be made via menus, as described above. For example, U.S. Pat. No. 8,014,607 describes an inferred mode protocol which allows certain editing operations to be directly on the digital ink. However, the described operations are very limited. Further, no solution is provided for the ability to manipulate the relative position of the diagram elements in digital ink while retaining recognized relationships.

U.S. Pat. No. 7,394,935 describes relative manipulations on the digital ink with respect to resizing and repositioning operations. However, in these operations the digital ink is either merely scaled in accordance with the manipulation, and as such the user would be required to perform further interaction to return the digital ink to its originally drawn dimensions, e.g., moving a container away from its connected container(s) would cause the connector to stretch in both x and y dimensions, or the connectors are 'reflowed' by re-computing a backbone (horizontal and vertical lines) that approximates the digital ink of the connector when the connector is resized or changed to a different form (e.g., straight to bent). This requires regeneration of the digital ink, which may be done through normalization of the connector ink through segmentation at high curvature points (cusps) as described in the related U.S. Pat. No. 7,324,691. Accordingly, the resultant manipulated digital ink may be quite different to the originally drawn ink, requiring intervention by users.

SUMMARY

The examples of the present invention that are described herein below provide systems, methods and a computer program product for use in diagram creation with handwriting input to a computing device. The computer program product has a non-transitory computer readable medium with a computer readable program code embodied therein adapted to be executed to implement the method.

The computing device is connected to an input device in the form of an input surface. A user is able to provide input by applying pressure to or gesturing above the input surface using either his or her finger or an instrument such as a stylus or pen. The present system and method monitors the input strokes.

The computing device has a processor and at least one application for detecting and recognizing the handwriting input under control of the processor. The at least one system application is configured to cause display of a plurality of input diagram elements in interactive ink on a display device associated with the computing device, identify at least one diagram element as a connector which connects a plurality of diagram elements, determine geometrical characteristics of the at least identified connector, and cause re-display of the diagram elements based on one or more interactions received with the interactive ink of the at least identified connector or one or more of the plurality of diagram elements connected thereby and in accordance with the determined geometrical characteristics.

Another aspect of the disclosed system and method provides identifying the at least one connector based on characteristics of the connector and positional relationships between the diagram elements.

Another aspect of the disclosed system and method provides the geometrical characteristics of the at least identified connector as related to a connection path between geometrical features of the connected diagram elements. The geometrical features include centers of geometry of the connected diagram elements.

Another aspect of the disclosed system and method provides the geometrical characteristics of the at least identified connector including a relationship between points of connection of the at least one connector with the connected diagram elements.

Another aspect of the disclosed system and method provides the connection path as offset from the centers of geometry of the connected diagram elements based on the points of connection.

Another aspect of the disclosed system and method provides the interactive ink as digital ink.

BRIEF DESCRIPTION OF THE DRAWINGS

The present system and method will be more fully understood from the following detailed description of the examples thereof, taken together with the drawings. In the drawings like reference numerals depict like elements. In the drawings.

DETAILED DESCRIPTION

Figure 1A:
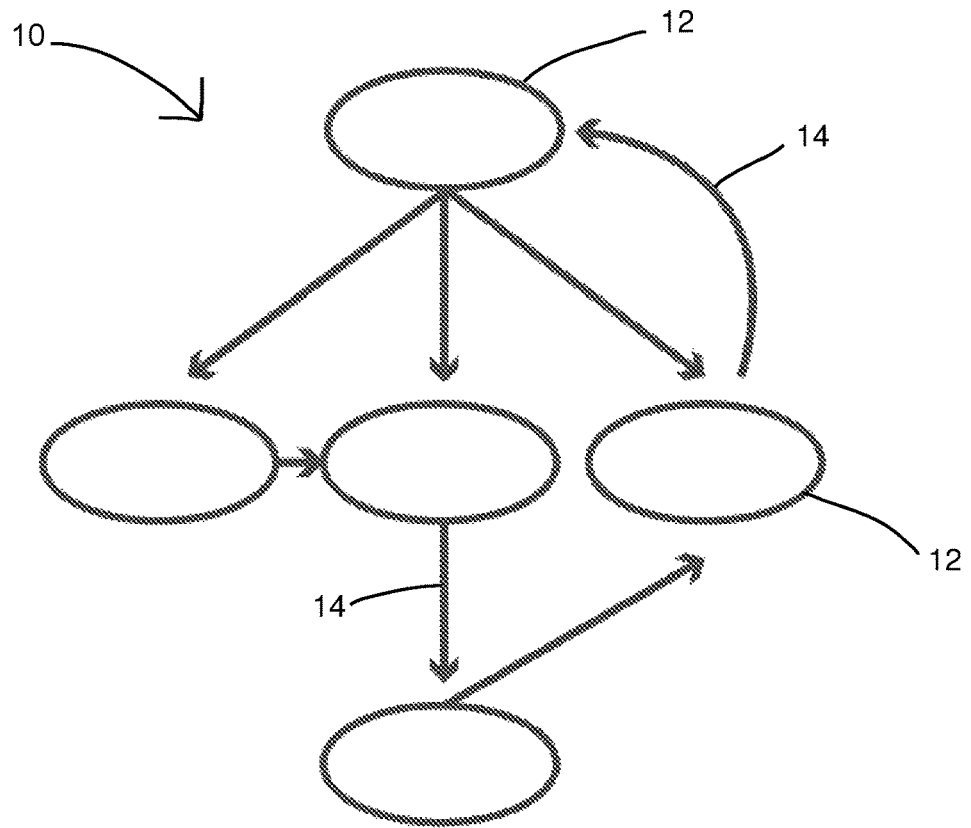
FIGS. 1A and 1B respectively show typeset and hand-written example concept maps.
Figure 1B:
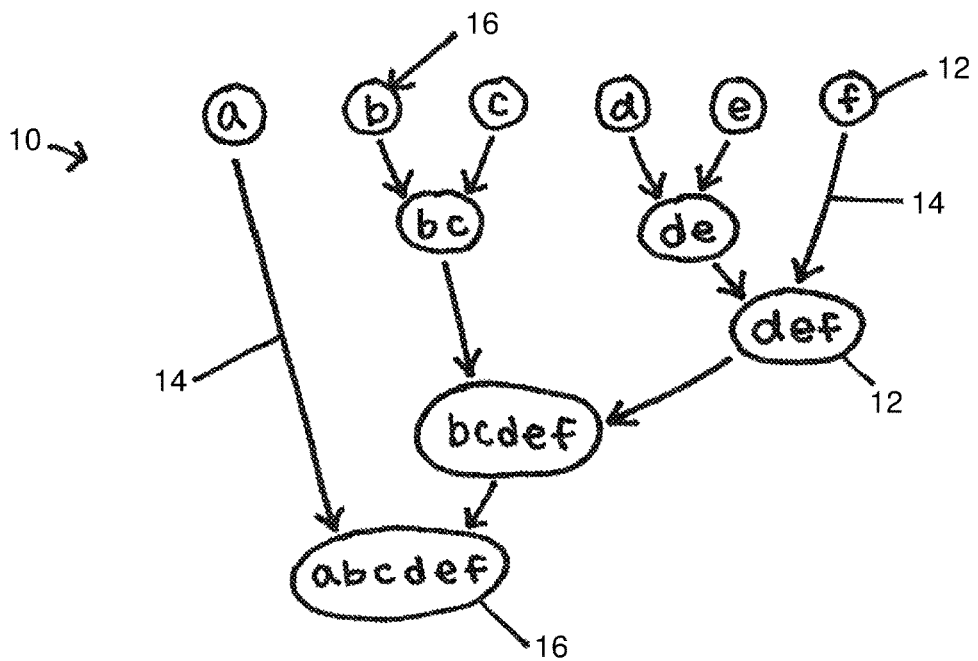
Figure 2A:
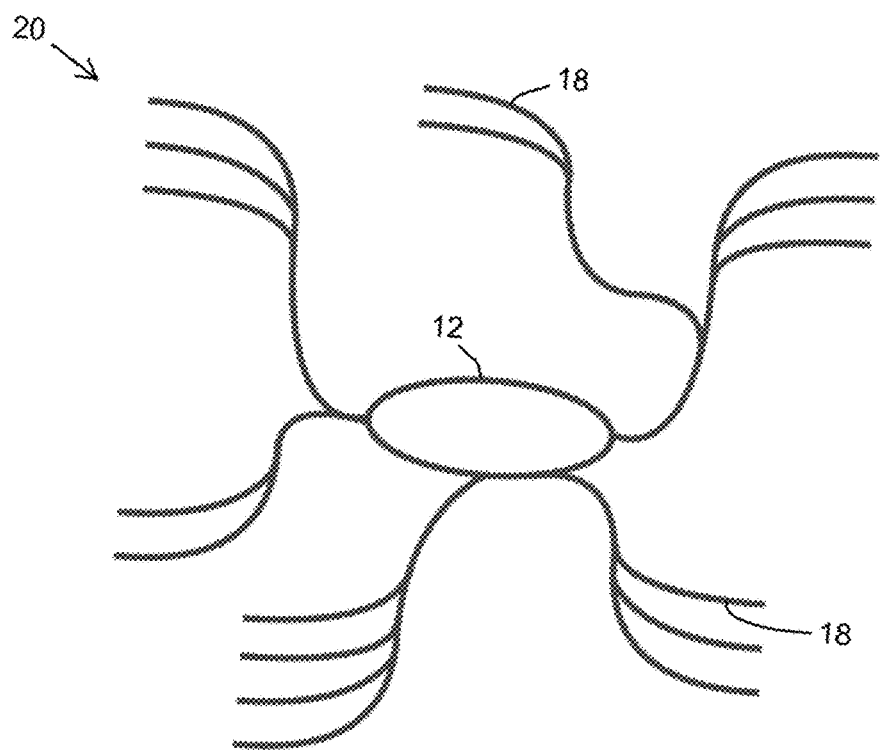
FIGS. 2A and 2B respectively show typeset and hand-written example mind-maps.
Figure 2B:
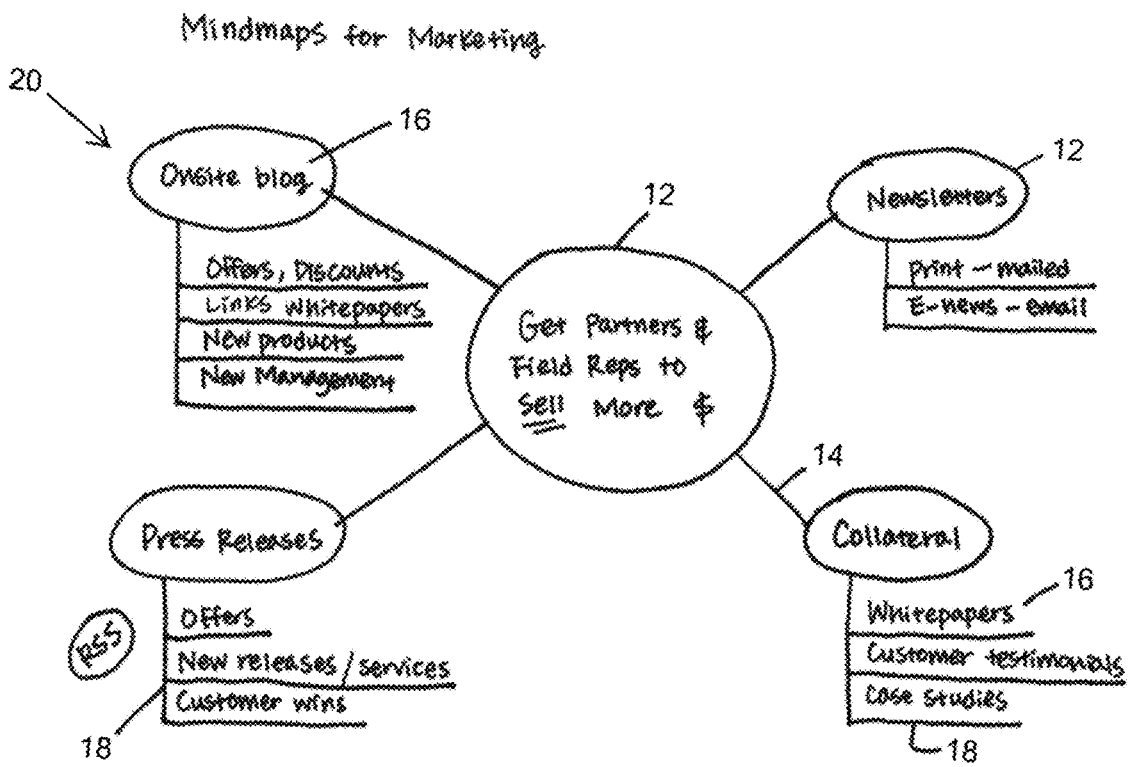
Figure 3A:
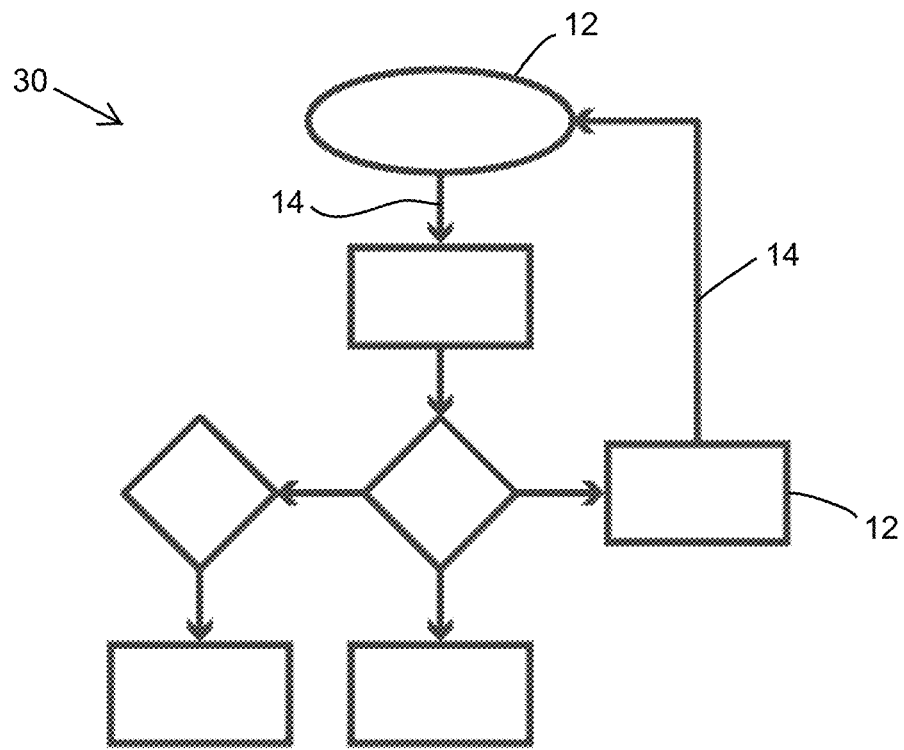
FIGS. 3A and 3B respectively show typeset and hand-written example flow charts or flow diagrams.
Figure 3B:
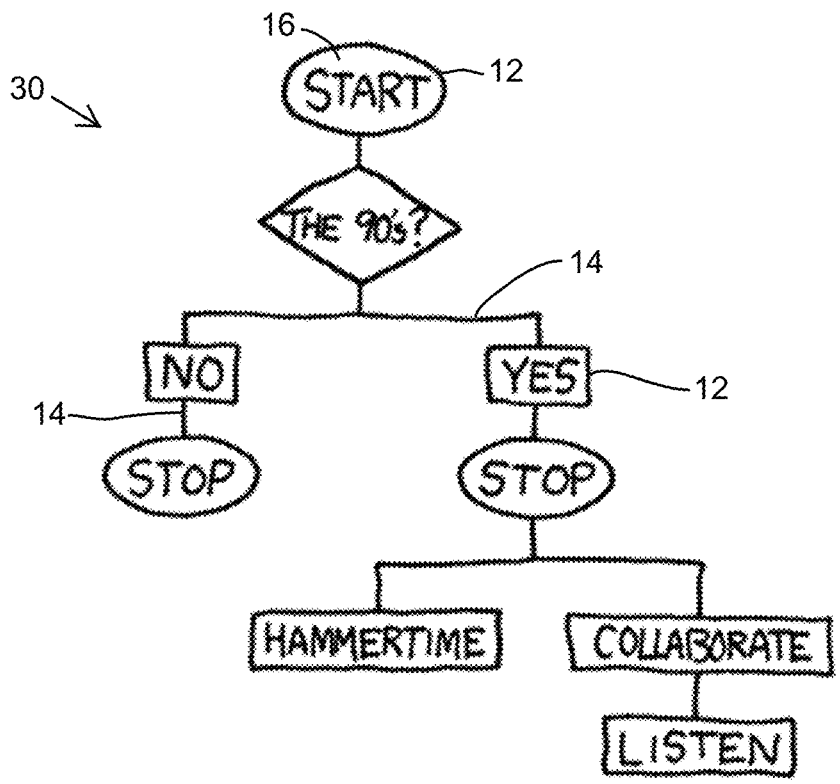
Figure 4A:
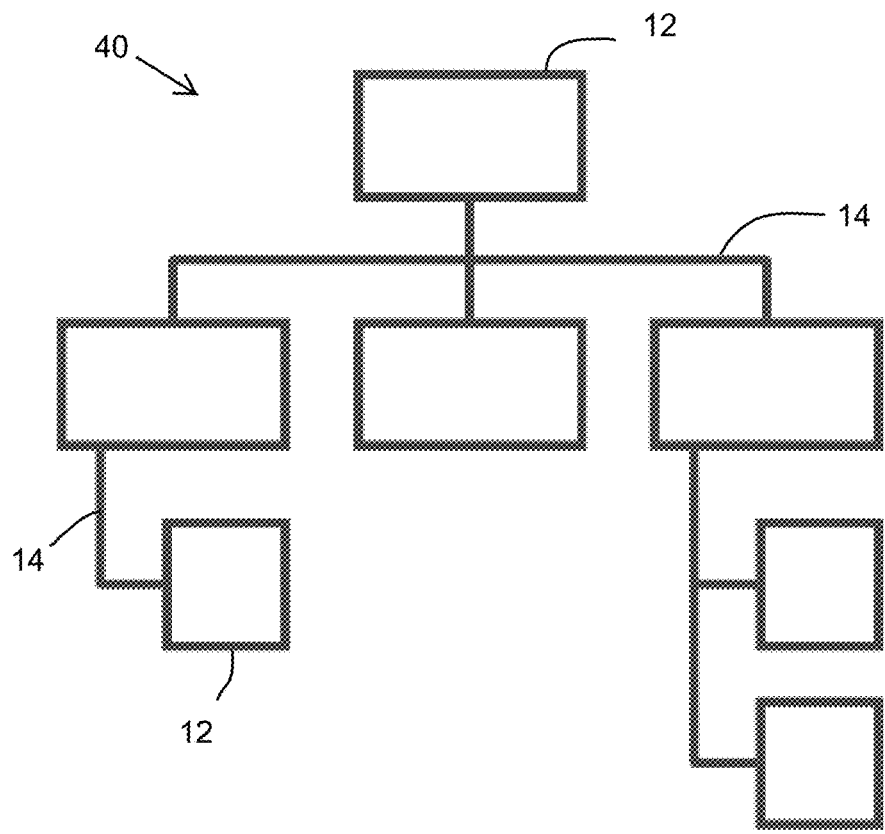
FIGS. 4A and 4B respectively show typeset and hand-written example organizational charts or diagrams.
Figure 4B:
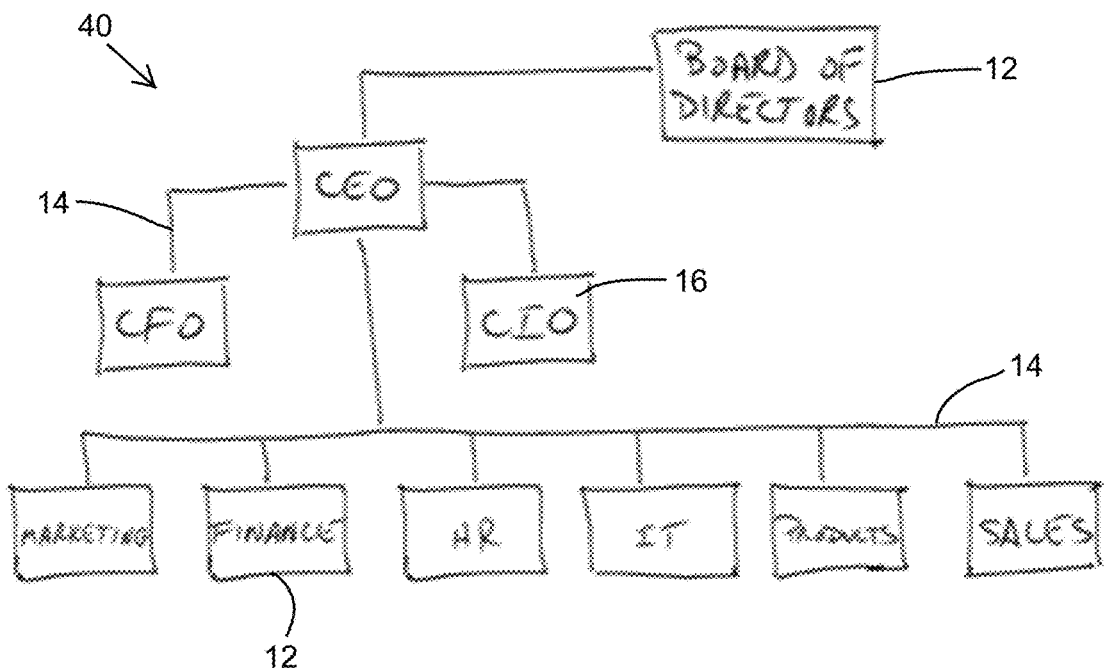
Figure 5A:
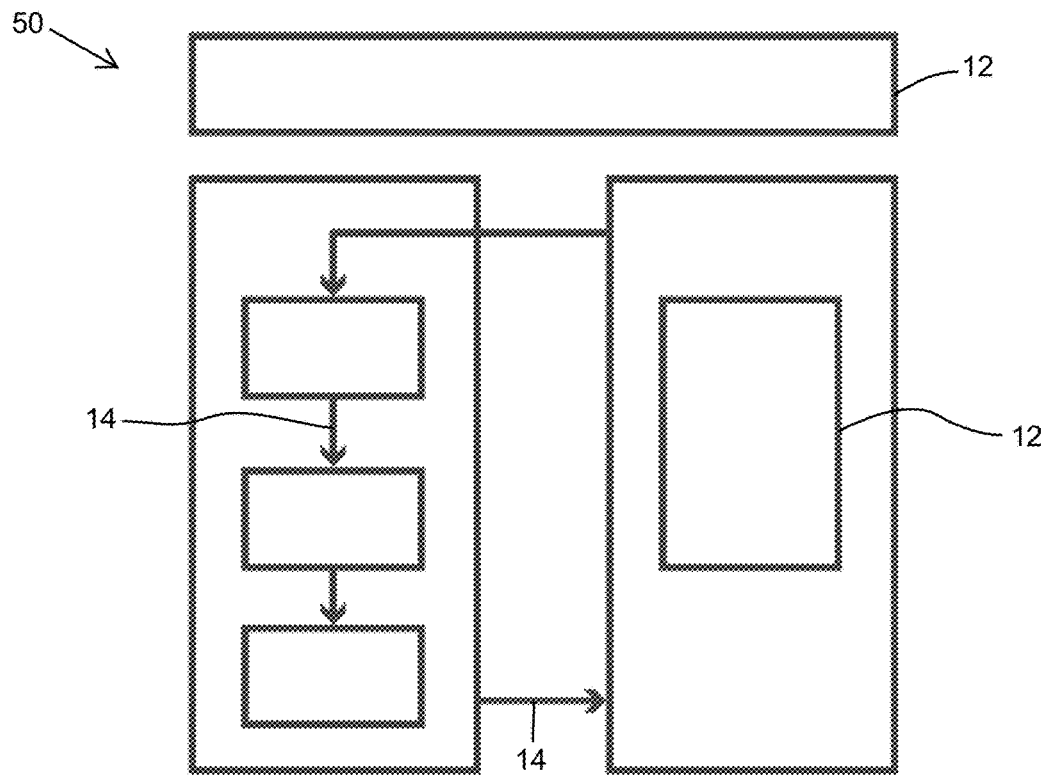
FIGS. 5A and 5B respectively show typeset and hand-written example block/architecture drawings.
Figure 5B:
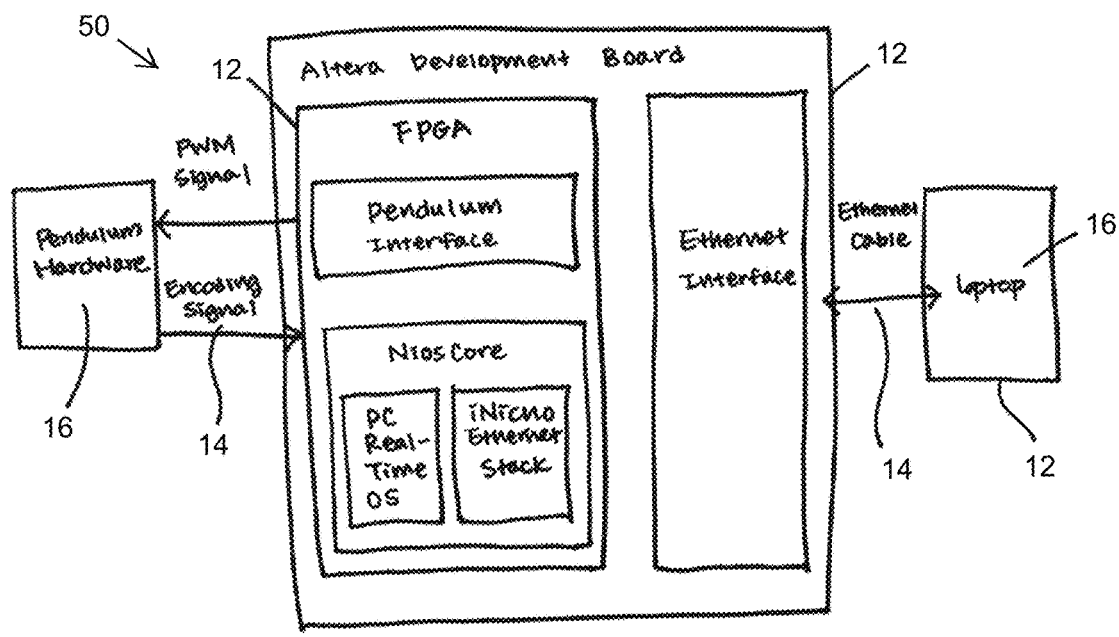
Figure 6A:
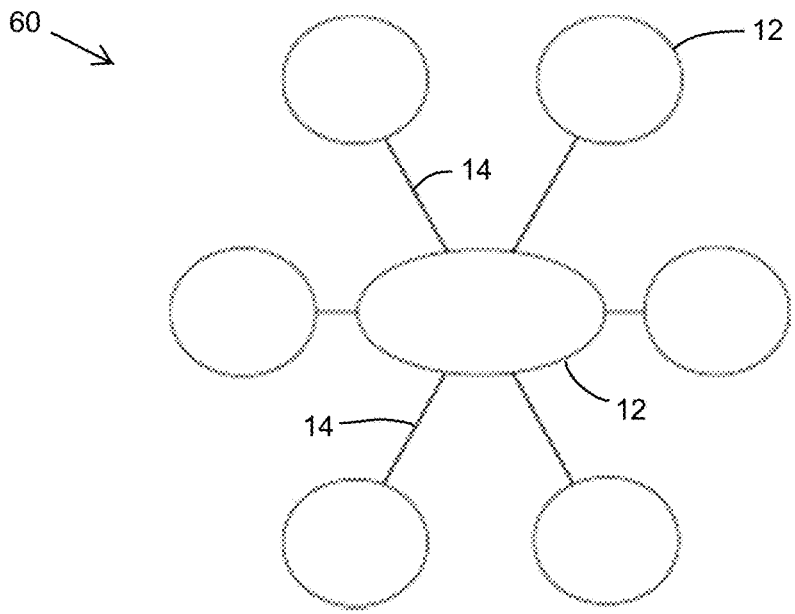
FIGS. 6A and 6B respectively show typeset and hand-written example spider maps.
Figure 6B:
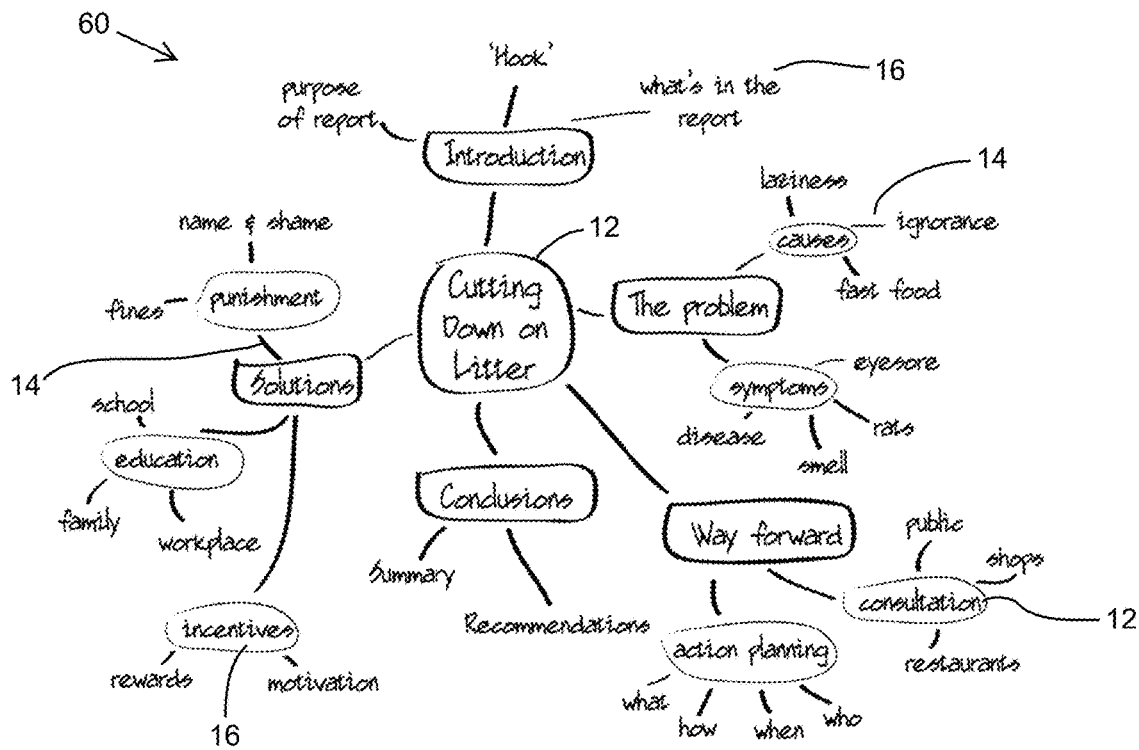

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Reference to and discussion of directional features such as up, down, above, below, lowest, highest, horizontal, vertical, etc., are made with respect to the Cartesian coordinate system as applied to the input surface on which the input to be recognized is made. Further, terms such as left and right are made in relation to the reader's frame of reference when viewing the drawings. Furthermore, the use of the term 'text' in the present description is understood as encompassing all alphanumeric characters, and strings thereof, in any written language and common place non-alphanumeric characters, e.g., symbols, used in written text. Further still, the term 'non-text' in the present description is understood as encompassing freeform handwritten or hand-drawn content and rendered text and image data, as well as non-alphanumeric characters, and strings thereof, and alphanumeric characters, and strings thereof, which are used in non-text contexts. Furthermore, the examples shown in these drawings are in a left-to-right written language context, and therefore any reference to positions can be adapted for written languages having different directional formats.

The various technologies described herein generally relate to capture, processing and management of hand-drawn and handwritten content on portable and non-portable computing devices in a manner which retains the inputted style of the content while allowing conversion to a faithful typeset or beautified version of that content. The systems and methods described herein may utilize recognition of users' natural writing and drawing styles input to a computing device via an input surface, such as a touch sensitive screen, connected to, or of, the computing device or via an input device, such as a digital pen or mouse, connected to the computing device or via a surface monitored by a position detection system. Whilst the various examples are described with respect to recognition of handwriting input using so-called online recognition techniques, it is understood that application is possible to other forms of input for recognition, such as offline recognition in which images rather than digital ink are recognized. The terms hand-drawing and handwriting are used interchangeably herein to define the creation of digital content by users through use of their hands either directly onto a digital or digitally connected medium or via an input tool, such as a hand-held stylus. The term "hand" is used herein to provide concise description of the input techniques, however the use of other parts of a users' body for similar input is included in this definition, such as foot, mouth and eye.

Figure 7:
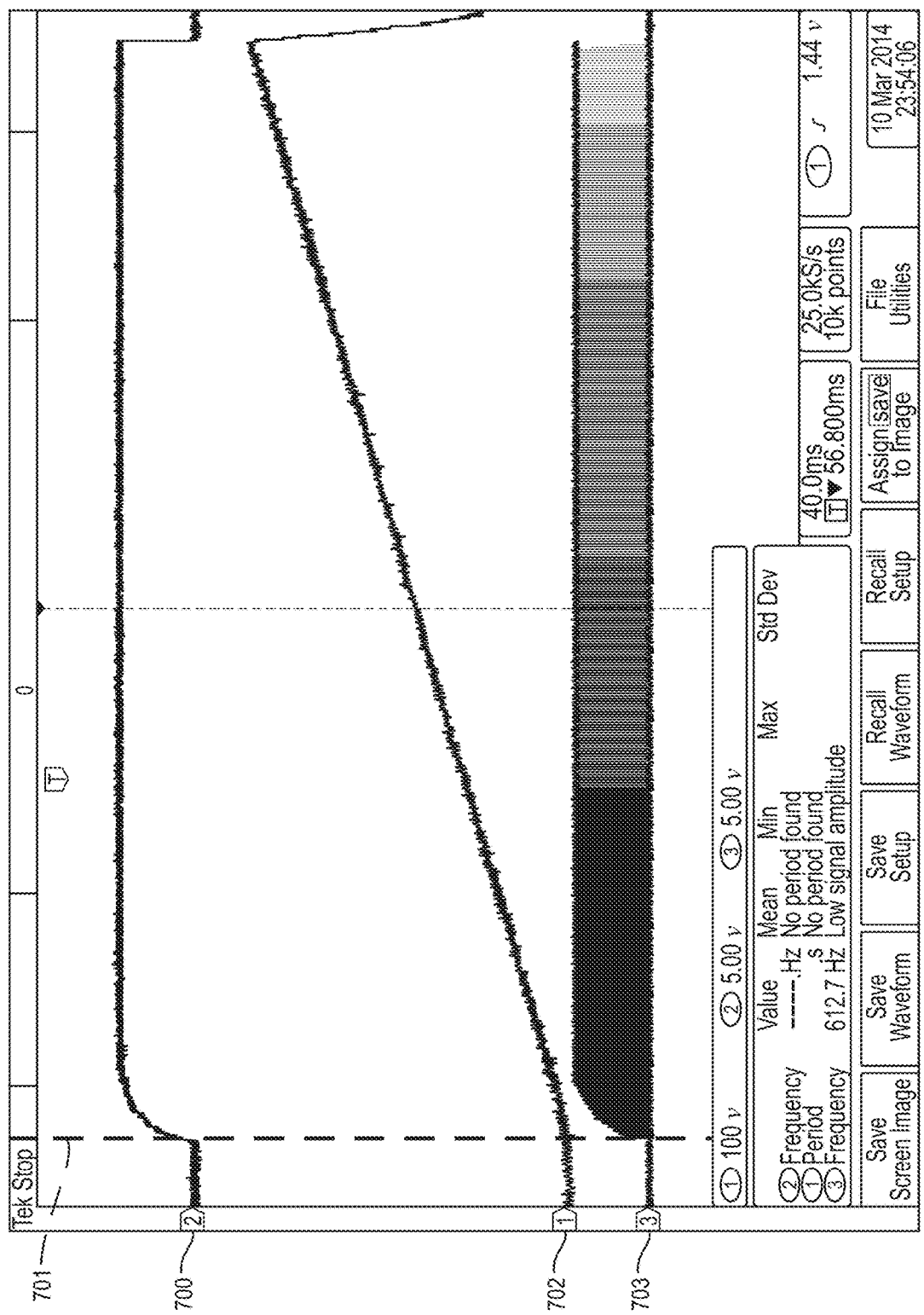
FIG. 7 shows a block diagram of a computing device in accordance with an example of the present system and method.

FIG. 7 shows a block diagram of an example computing device 100. The computing device may be a computer desktop, laptop computer, tablet computer, e-book reader, mobile phone, smartphone, wearable computer, digital watch, interactive whiteboard, global positioning system (GPS) unit, enterprise digital assistant (EDA), personal digital assistant (PDA), game console, or the like. The computing device 100 includes components of at least one processing element, some form of memory and input and/or output (I/O) devices. The components communicate with each other through inputs and outputs, such as connectors, lines, buses, cables, buffers, electromagnetic links, networks, modems, transducers, IR ports, antennas, or others known to those of ordinary skill in the art.

The computing device 100 has at least one display 102 for outputting data from the computing device such as images, text, and video. The display 102 may use LCD, plasma, LED, iOLED, CRT, or any other appropriate technology that is or is not touch sensitive as known to those of ordinary skill in the art. The display 102 may be co-located with at least one input surface 104 or remotely connected thereto. The input surface 104 may employ technology such as resistive, surface acoustic wave, capacitive, infrared grid, infrared acrylic projection, optical imaging, dispersive signal technology, acoustic pulse recognition, or any other appropriate technology as known to those of ordinary skill in the art to receive user input in the form of a touch- or proximity-sensitive surface. The input surface 104 may be bounded by a permanent or video-generated border that clearly identifies its boundaries. The input surface 104 may a non-touch sensitive surface which is monitored by a position detection system.

In addition to the input surface 104, the computing device 100 may include one or more additional I/O devices (or peripherals) that are communicatively coupled via a local interface. The additional I/O devices may include input devices such as a keyboard, mouse, scanner, microphone, touchpads, bar code readers, laser readers, radio-frequency device readers, or any other appropriate technology known to those of ordinary skill in the art. Further, the I/O devices may include output devices such as a printer, bar code printers, or any other appropriate technology known to those of ordinary skill in the art. Furthermore, the I/O devices may include communications devices that communicate both inputs and outputs such as a modulator/demodulator (modem; for accessing another device, system, or network), a radio frequency (RF) or other transceiver, a telephonic interface, a bridge, a router, or any other appropriate technology known to those of ordinary skill in the art. The local interface may have additional elements to enable communications, such as controllers, buffers (caches), drivers, repeaters, and receivers, which are omitted for simplicity but known to those of skill in the art. Further, the local interface may include address, control, and/or data connections to enable appropriate communications among the other computer components.

The computing device 100 also includes a processor 106, which is a hardware device for executing software, particularly software stored in the memory 108. The processor can be any custom made or commercially available general purpose processor, a central processing unit (CPU), a semiconductor based microprocessor (in the form of a microchip or chipset), a macroprocessor, microcontroller, digital signal processor (DSP), application specific integrated circuit (ASIC), field programmable gate array (FPGA) or other programmable logic device, discrete gate or transistor logic, discrete hardware components, state machine, or any combination thereof designed for executing software instructions known to those of ordinary skill in the art. Examples of suitable commercially available microprocessors are as follows: a PA-RISC series microprocessor from Hewlett-Packard Company, an 80x86 or Pentium series microprocessor from Intel Corporation, a PowerPC microprocessor from IBM, a Sparc microprocessor from Sun Microsystems, Inc., a 68xxx series microprocessor from Motorola Corporation, DSP microprocessors, or ARM microprocessors.

The memory 108 may include any one or a combination of volatile memory elements (e.g., random access memory (RAM, such as DRAM, SRAM, or SDRAM)) and nonvolatile memory elements (e.g., ROM, EPROM, flash PROM, EEPROM, hard drive, magnetic or optical tape, memory registers, CD-ROM, WORM, DVD, redundant array of inexpensive disks (RAID), another direct access storage device (DASD)). Moreover, the memory 108 may incorporate electronic, magnetic, optical, and/or other types of storage media. The memory 108 can have a distributed architecture where various components are situated remote from one another but can also be accessed by the processor 106. Further, the memory 108 may be remote from the device, such as at a server or cloud-based system, which is remotely accessible by the computing device 100. The memory 108 is coupled to the processor 106, so the processor 106 can read information from and write information to the memory 108. In the alternative, the memory 108 may be integral to the processor 106. In another example, the processor 106 and the memory 108 may both reside in a single ASIC or other integrated circuit.

The software in the memory 108 includes an operating system 110 and an application 112. The software optionally further includes a handwriting recognition (HWR) system 114 which may each include one or more separate computer programs. Each of these has an ordered listing of executable instructions for implementing logical functions. The operating system 110 controls the execution of the application 112 (and the HWR system 114). The operating system 110 may be any proprietary operating system or a commercially available operating system, such as WEBOS, WINDOWS®, MAC and IPHONE OS®, LINUX, and ANDROID. It is understood that other operating systems may also be utilized.

The application 112 includes one or more processing elements related to detection, management and treatment of hand-drawn shapes and handwritten text input by users (discussed in detail later). The software may also include one or more other applications related to handwriting recognition, different functions, or both. Some examples of other applications include a text editor, telephone dialer, contacts directory, instant messaging facility, computer-aided design (CAD) program, email program, word processing program, web browser, and camera. The application 112, and the other applications, include program(s) provided with the computing device 100 upon manufacture and may further include programs uploaded or downloaded into the computing device 100 after manufacture.

The present system and method make use of the HWR system 114 in order to recognize handwritten input to the device 100, including handwritten text and hand-drawn shapes, e.g., non-text. The HWR system 114, with support and compliance capabilities, may be a source program, executable program (object code), script, application, or any other entity having a set of instructions to be performed. When a source program, the program needs to be translated via a compiler, assembler, interpreter, or the like, which may or may not be included within the memory, so as to operate properly in connection with the operating system. Furthermore, the handwriting recognition system with support and compliance capabilities can be written as (a) an object oriented programming language, which has classes of data and methods; (b) a procedure programming language, which has routines, subroutines, and/or functions, for example but not limited to C, C++, Pascal, Basic, Fortran, Cobol, Perl, Java, Objective C, Swift, and Ada; or (c) functional programming languages for example but no limited to Hope, Rex, Common Lisp, Scheme, Clojure, Racket, Erlang, OCaml, Haskell, Prolog, and F#. Alternatively, the HWR system 114 may be a method or system for communication with a handwriting recognition system remote from the device, such as server or cloud-based system, but is remotely accessible by the computing device 100 through communications links using the afore-mentioned communications I/O devices of the computing device 100. Further, the application 112 and the HWR system 114 may operate together accessing information processed and stored in the memory 108, for example, by each system, or be combined as a single application.

Strokes entered on or via the input surface 104 are processed by the processor 106 as digital ink. A user may enter a stroke with a finger or some instrument such as a pen or stylus suitable for use with the input surface. The user may also enter a stroke by making a gesture above the input surface 104 if technology that senses motions in the vicinity of the input surface 104 is being used, or with a peripheral device of the computing device 100, such as a mouse or joystick. A stroke is characterized by at least the stroke initiation location, the stroke termination location, and the path connecting the stroke initiation and termination locations. Because different users may naturally write the same object, e.g., a letter, a shape, a symbol, with slight variations, the HWR system accommodates a variety of ways in which each object may be entered whilst being recognized as the correct or intended object.

Figure 8:
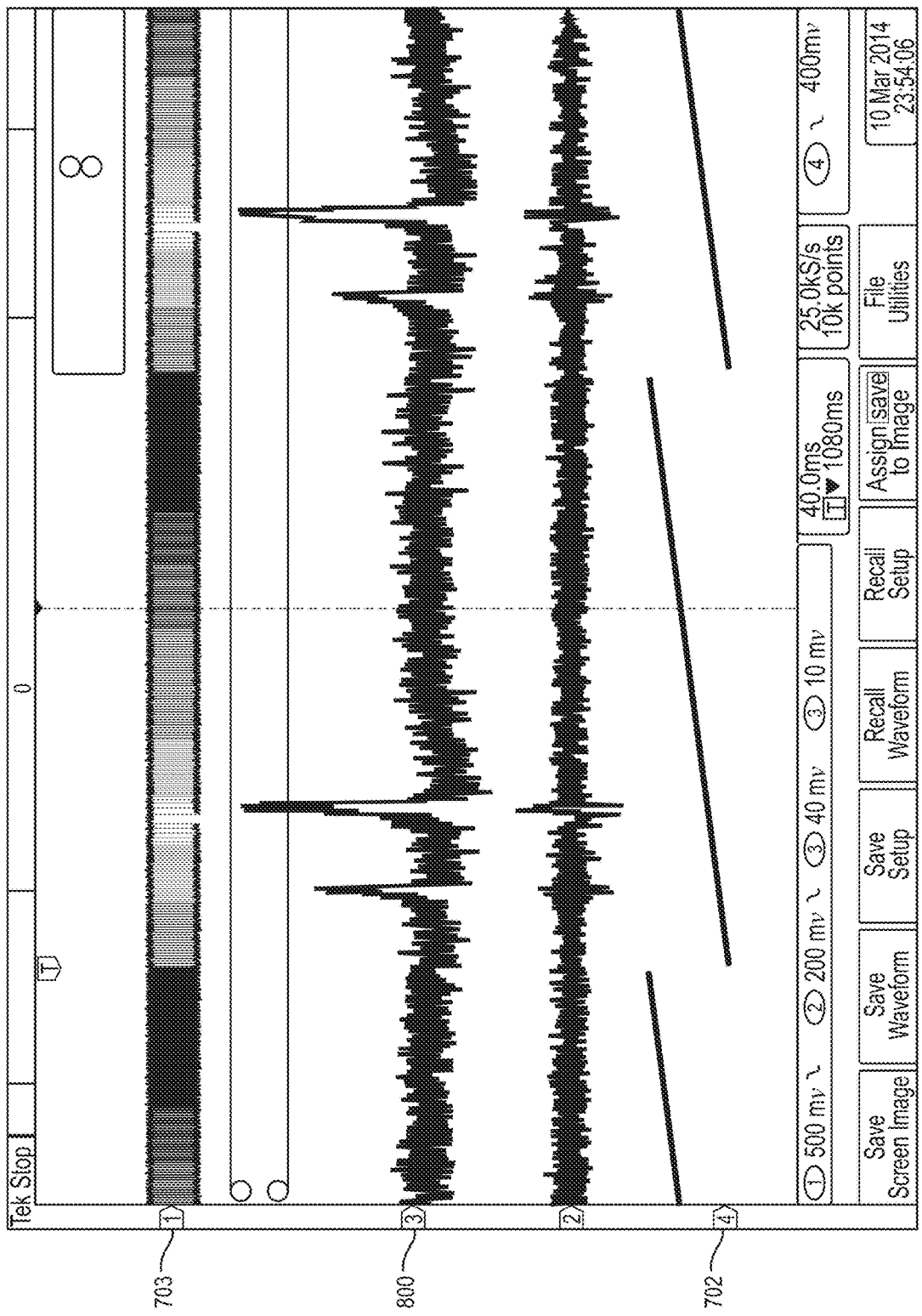
FIG. 8 shows a block diagram of a system for handwriting recognition in accordance with an example of the present system and method.

FIG. 8 is a schematic pictorial of an example of the HWR system 114, in either its local (i.e., loaded on the device 100) or remote (i.e., remotely accessible by the device 100) forms. The HWR system 114 includes stages such as preprocessing 116, recognition 118 and output 120. The preprocessing stage 116 processes the digital ink to achieve greater accuracy and reducing processing time during the recognition stage 118. This preprocessing may include normalizing of the path connecting the stroke initiation and termination locations by applying size normalization and/or methods such as B-spline approximation to smooth the input. The preprocessed strokes are then passed to the recognition stage 118 which processes the strokes to recognize the objects formed thereby. The recognized objects are then output 120 to the memory 108 and the display 102 as a digital ink or typeset ink versions of the handwritten elements/characters and hand-drawn shapes.

Figure 9:
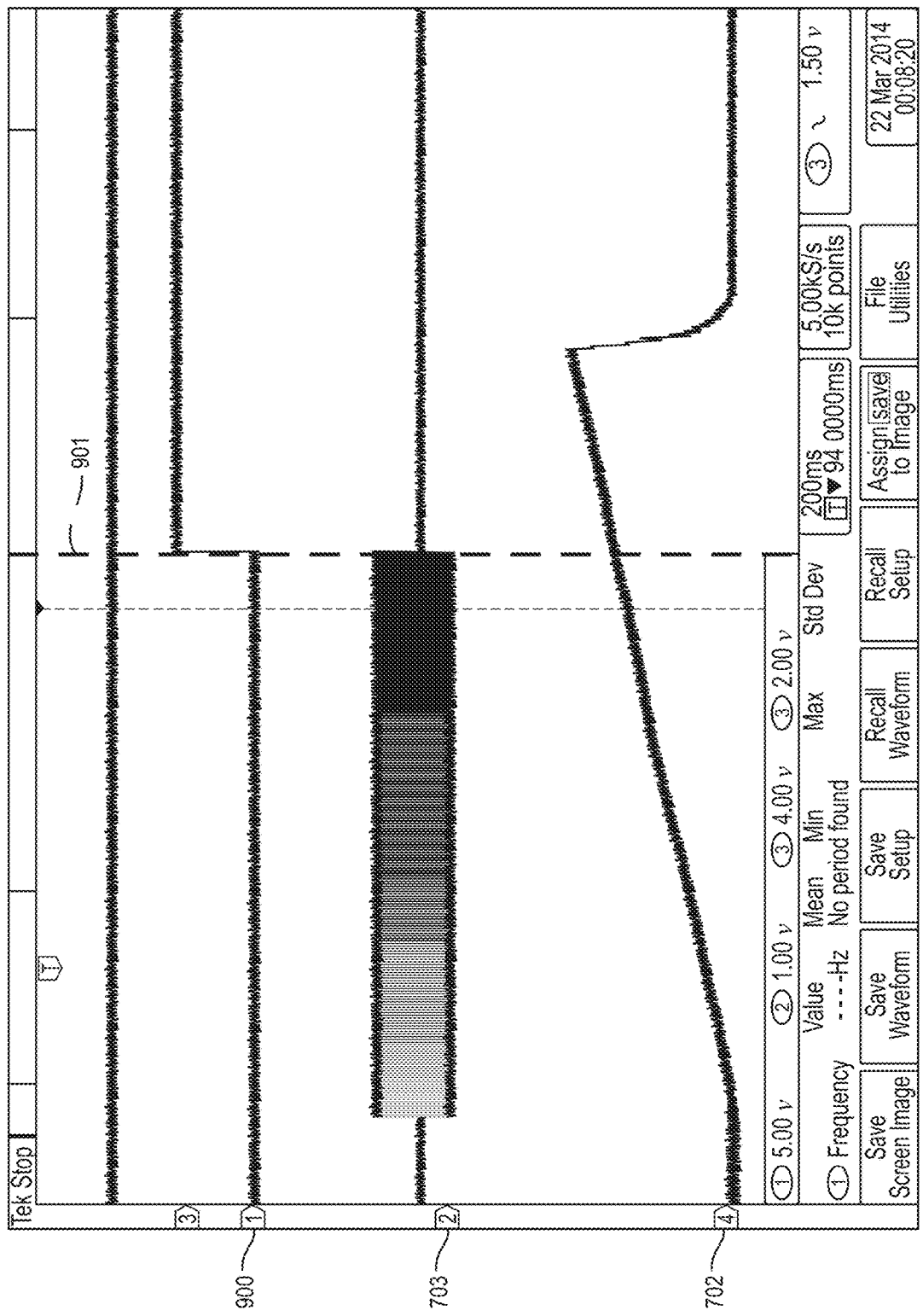
FIG. 9 shows a block diagram illustrating detail of the handwriting recognition system of FIG. 8 in accordance with an example of the present system and method.

The recognition stage 118 may include different processing elements or experts. FIG. 9 is a schematic pictorial of the example of FIG. 8 showing schematic detail of the recognition stage 118. Three experts, a segmentation expert 122, a recognition expert 124, and a language expert 126, are illustrated which collaborate through dynamic programming to generate the output 120.

The segmentation expert 122 defines the different ways to segment the input strokes into individual element hypotheses, e.g., alphanumeric characters and mathematical operators, text characters, individual shapes, or sub expression, in order to form expressions, e.g., words, mathematical equations, or groups of shapes. For example, the segmentation expert 122 may form the element hypotheses by grouping consecutive strokes of the original input to obtain a segmentation graph where each node corresponds to at least one element hypothesis and where adjacency constraints between elements are handled by the node connections. Alternatively, the segmentation expert 122 may employ separate experts for different input types, such as text, drawings, equations, and music notation.

The recognition expert 124 provides classification of the features extracted by a classifier 128 and outputs a list of element candidates with probabilities or recognition scores for each node of the segmentation graph. Many types of classifiers exist that could be used to address this recognition task, e.g., Support Vector Machines, Hidden Markov Models, or Neural Networks such as Multilayer Perceptrons, Deep, Convolutional or Recurrent Neural Networks. The choice depends on the complexity, accuracy, and speed desired for the task.

The language expert 126 generates linguistic meaning for the different paths in the segmentation graph using language models (e.g., grammar or semantics). The expert 126 checks the candidates suggested by the other experts according to linguistic information 130. The linguistic information 130 can include a lexicon(s), regular expressions, etc. The language expert 126 aims at finding the best recognition path. In one example, the language expert 126 does this by exploring a language model such as final state automaton (determinist FSA) representing the content of linguistic information 130. In addition to the lexicon constraint, the language expert 126 may use statistical information modeling for how frequent a given sequence of elements appears in the specified language or is used by a specific user to evaluate the linguistic likelihood of the interpretation of a given path of the segmentation graph.

The application 112 provided by the present system and method allows users, such as students, academic and working professionals, to create handwritten diagrams and have those diagrams faithfully recognized using the HWR system 114 independent of the type of diagram created, e.g., flowcharts, organizational charts, concept maps, spider maps, block/architecture diagrams, mind-maps, block diagrams, Venn diagrams and pyramids. This list is not exhaustive and other types, or non-types, of diagrams are possible. For example, the different elements of the hand-drawn diagrams illustrated in FIGS. 1B, 2B 3B 4B, 5B and 6B are individually recognized together with any spatial and context relationships there between without regard to the diagram type. As discussed earlier, these diagram elements include shape and text elements. Shape or drawing elements are those that define graphic or geometric formations in linear or non-linear configurations, and include containers, connectors and free-form drawings. Text elements are those that contain text characters and include text blocks and labels for the text blocks and shape elements. Both text blocks and labels may contain text of one or more characters, words, sentences or paragraphs provided in one or more vertical lines. Text blocks may be contained by containers (internal text blocks) or may be provided outside of containers (external text blocks). External text blocks may be unrelated to containers or other elements of a diagram or may be directly related to certain other diagram elements.

Further, the application 112 provided by the present system and method allows users to hand-draw such shapes and text freely without being slowed by the technology as they would on paper, while benefiting from the power of digital tools which allow capture of editing operations of the created diagrams. In particular, editing is supported which enables the shapes to be moved and manipulated for the creation of space for new ideas, the change of connections or shape type, and the handling of editing gestures. The handling of editing operations performed on connectors by the present system and method is now described in relation to example diagrams illustrated in FIGS. 10 to 18.

Figure 10A:
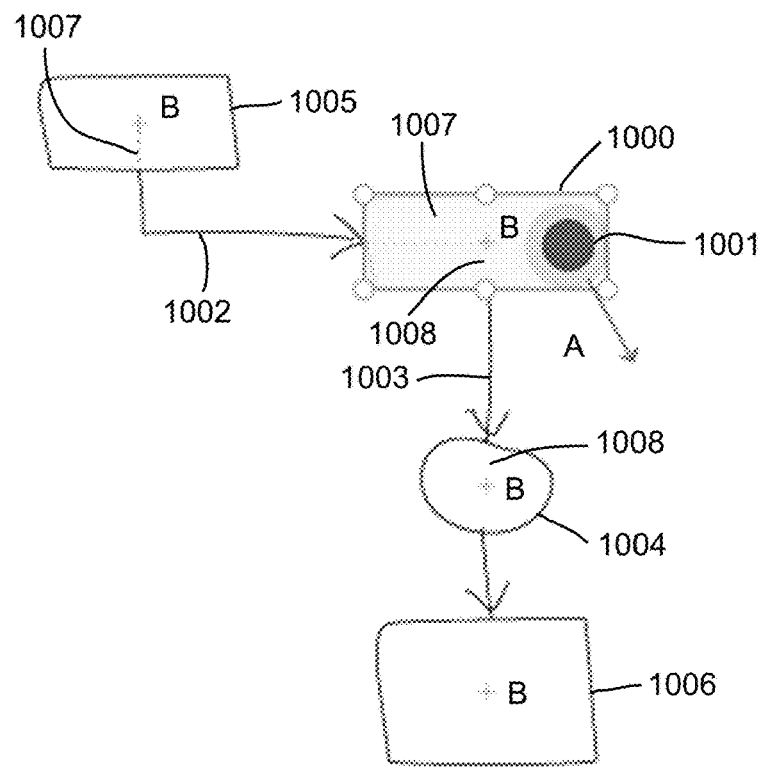
FIGS. 10A and 10B respectively show an example hand-drawn diagram before and after a movement operation on a shape element connected to other shape elements with connectors.
Figure 10B:
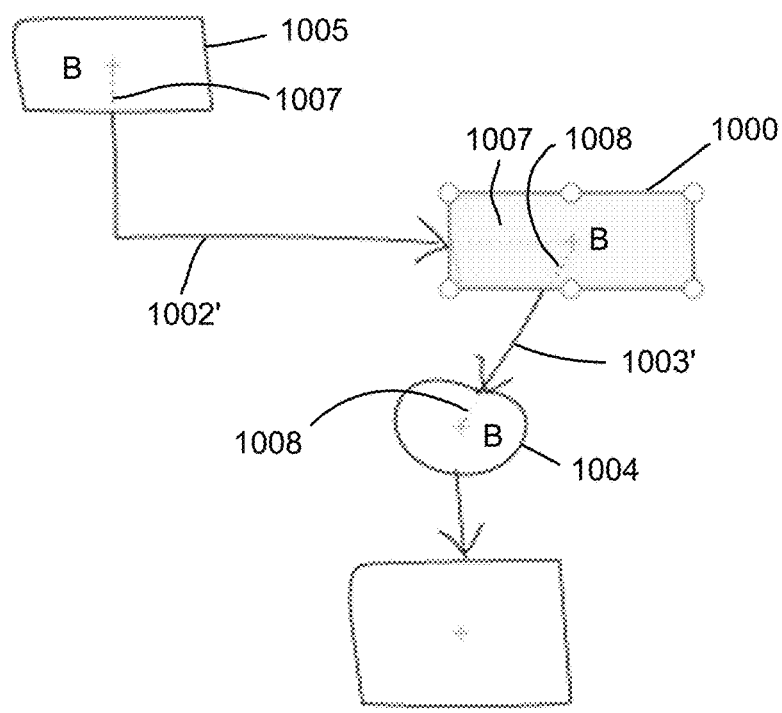

FIG. 10 shows a movement operation on a digital ink box with example consequential effect on digital ink connectors associated therewith in a hand-drawn diagram. In FIG. 10A, a box 1000 is selected by a selection gesture 1001 and moved in the direction of arrow A. The selected box is illustrated in selection mode rendering upon this selection. The box has two associated connectors, a bent arrow connector 1002 and straight arrow connector 1003. The adjusted display at the completion of the movement operation is shown in FIG. 10B, in which the connectors 1002 and 1003 are respectively displayed as adjusted connectors 1002' and 1003'. The bent connector 1002 is adjusted with its separate arms (i.e., joined at the 'elbow' of the bent connector) being lengthened about the elbow.

The connector 1003, which is displayed substantially vertical in FIG. 10A is adjusted to be shortened and displayed at a slanted angle to the vertical as the adjusted connector 1003' in FIG. 10B. The change in angle of the connector is performed so as to retain the geometry of the connector, e.g., the adjusted connector 1003' is rendered to be substantially straight like the original connector 1003 and not caused to be curved due to the movement of box 1000. Such curving, for example, would be required if the connection or anchor points of the connector 1003 to the box 1000 and another box 1004 were maintained for the adjusted connector 1003'. However, adjustment of the connection points is made to retain the connector's geometry and to provide a sensible re-display during and after the movement operation. This may be achieved by taking account of the center of geometry of each connected shape.

As can be seen in FIG. 10A, the center of geometry of the boxes 1000 and 1004, and other connected boxes 1005 and 1006, are determined by the application 112 as indicated by the cross-marks B. The path of connection between each center of geometry and the associated connector which takes account of the geometry of the connector is also determined, shown for the connector 1002 between the boxes 1000 and 1005, for example, as dashed line 1007 which bends at the elbow of the bent connector 1002. When the box 1000 is moved, the determined connection paths between the centers of geometry of the connected boxes are adjusted to remain between the centers of geometry whist retaining the path geometry, for example, as shown in FIG. 10B, the connection path 1007 retains its bent geometry and connection path 1008 of the straight connector 1003 retains its straight geometry between the centers of gravity of the boxes 1000 and 1004 such that it becomes angled to the vertical. Accordingly, the adjusted bent connector 1002' is rendered along the adjusted connection path 1007 and the adjusted connector 1003' is rendered along the adjusted connection path 1008.

Figure 11A:
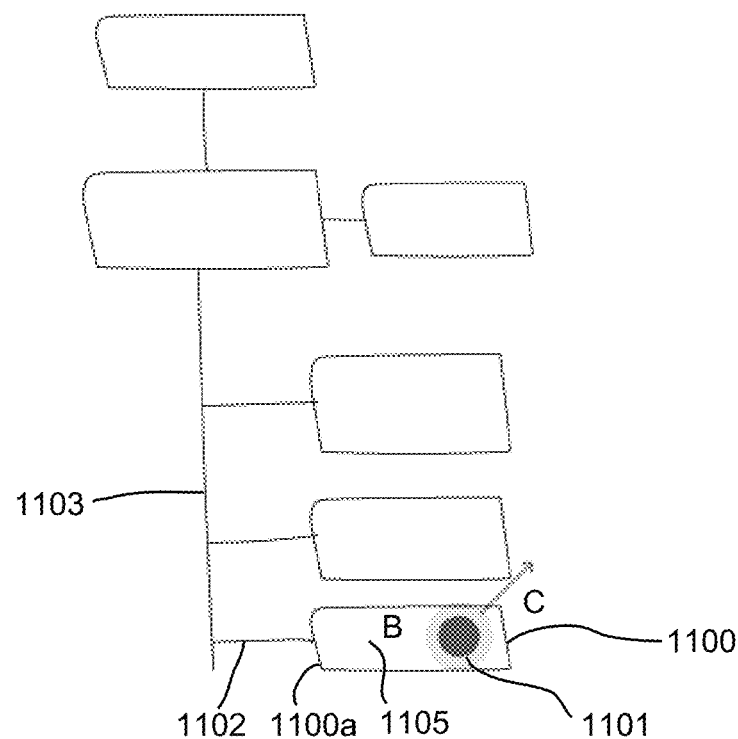
FIG. 11A shows a movement operation on a digital ink shape with example consequential effect on a digital ink connector in an example hand-drawn diagram.
Figure 11B:
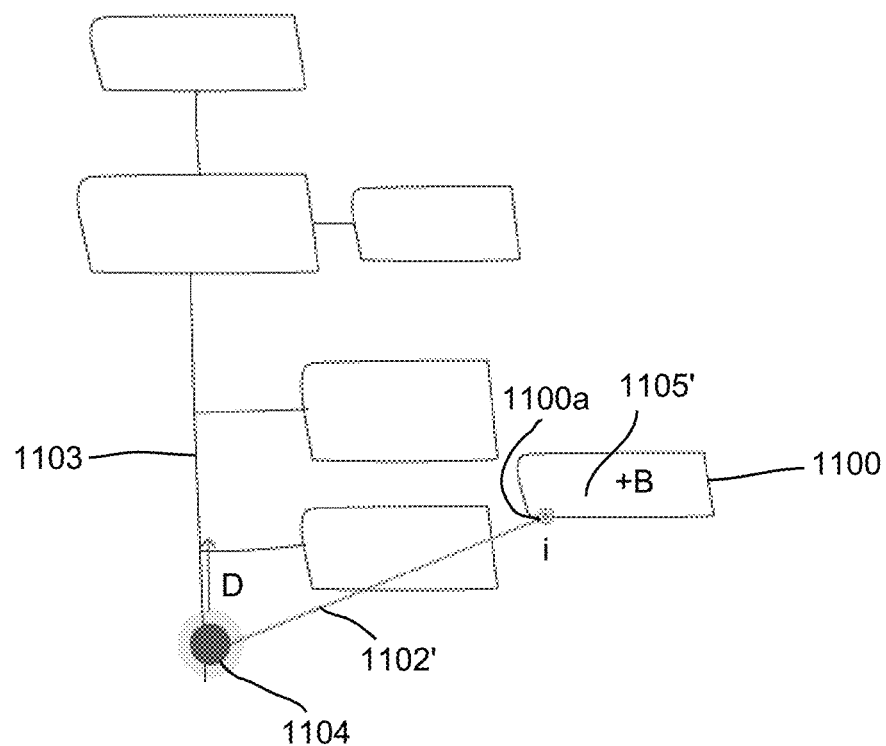
FIG. 11B shows a movement operation on the digital ink connector of the diagram of FIG. 11A.

FIG. 11 shows a movement operation on a digital ink box and digital ink connector with example consequential effect on the digital ink connector in a hand-drawn diagram. In FIG. 11A, a box 1100 is selected by a selection gesture 1101 and moved in the direction of arrow C. The box has an associated straight connector 1102. The connector 1102 is a branch of a branched connector 1103. Branched connectors are complex or multi-connectors with sub-connectors formed of a trunk and branches extending from the trunk. The trunk and the branches may themselves by multi-connectors, such as bent or branched connectors. The adjusted display at the completion of the movement operation is shown in FIG. 11B, in which the connector 1102 is displayed as an adjusted connector 1102'. The connector 1102, which is displayed substantially horizontal in FIG. 11A is adjusted to be lengthened and displayed at a slanted angle to the horizontal as the adjusted connector 1102' in FIG. 11B.

Figure 11C:
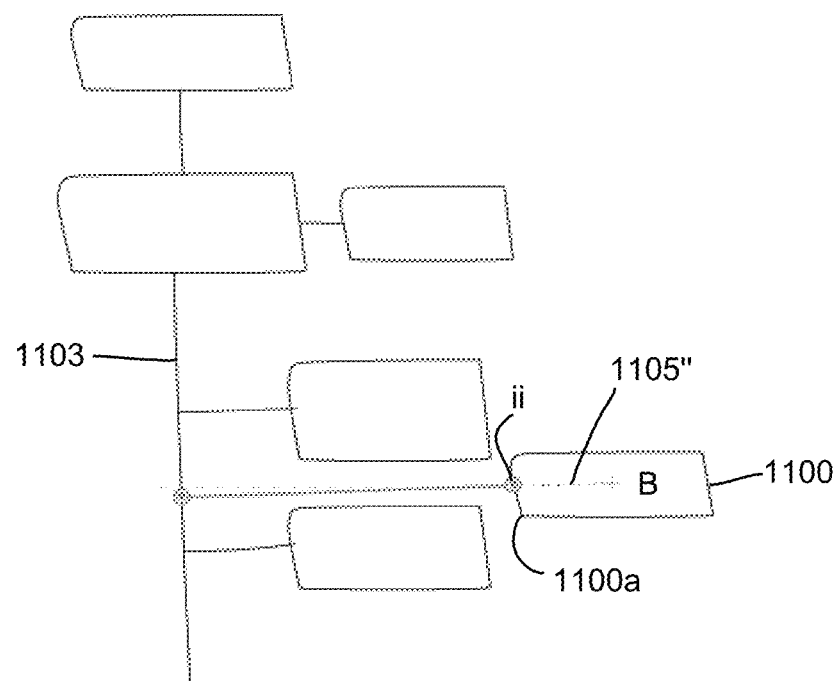
FIG. 11C shows the diagram of FIG. 11B after the movement operations.

The connection point of the (branch) connector 1102 to the (trunk) connector 1103 is not adjusted in order to retain the original relationships of the diagram created by the user and because it is unknown to the application 112 whether a position of the box 1100 in a hierarchical structure of the boxes connected via the trunk of the branched connector is being changed to a level which is the same (e.g., directly connected to the trunk) or a lower level (e.g., connected to one of the other boxes). Alternatively, the connection point may be adjusted automatically if the intent of the movement can be ascertained. Further in FIG. 11B, the adjusted connector 1102' is selected by a selection gesture 1104 and moved in the direction of arrow D. The selected adjusted connector is illustrated in selection mode rendering upon this selection. The adjusted display at the completion of the movement operation is shown in FIG. 11C, in which the adjusted connector 1102' is displayed as an adjusted connector 1102".

As can be seen, the center of geometry of the box 1100 is determined by the application 112 as indicated by the cross-mark B. In FIG. 11A, the path of connection from this center of geometry and the trunk connector 1103 is shown as a dashed line 1105. When the box 1100 is moved, this determined connection path is adjusted as shown by dashed line 1105' so that the connector 1102 remains on the connection path from the center of geometry, as shown in FIG. 11B. When the connector 1103 is moved, this determined connection path is adjusted as shown by dashed line 1105" so that the connector 1102 remains on the connection path from the center of geometry, as shown in FIG. 11C. Accordingly, the adjusted connector 1102' is rendered along the connection path 1105' which results in the connection point of the connector 1102 to the boundary of the box 1100 moving from point i in FIG. 11A to point ii in FIG. 11B. As a result the connector 1102 is moved around a corner 1100*a* of the box 1100. Then the adjusted connector 1102" is rendered along the connection path 1105" which results in the connection point of the connector 1102 to the boundary of the box 1100 moving from point ii in FIG. 11B back to point i in FIG. 11C. As a result the connector 1102 is moved back around the corner 1100*a* of the box 1100.

In both FIGS. 10 and 11, the points of connection of the connectors on the connected shapes are moved in relation to centers of geometry of the shapes and connections paths there between. As such, in the examples of FIGS. 10 and 11, the center of geometry is treated as an anchor point for the connectors. This differs from conventional techniques in which the connection points themselves are treated as anchor points on container boundaries. Whilst this treatment is not problematic in many editing operations, it can cause undesirable results in many others which require users to interact with the diagram elements again in order to move the connection points. On the other hand, the adjustment of the connection points of the present system and method concurs with users' intent in editing, such as moving and resizing, objects because the connection itself, rather than the parameters of the connection, is respected. While the direct use of the center of geometry to anchor the connectors provides good results in many situations, more complex positional changes of objects require more complex adjustment of the connections. For example, (direct) use of the centers of geometry generally works well for connectors having connection points that are substantially centered on the boundaries of the connected objects, but does not work well for offset connection points or for objects having multiple connectors on their side. An example of a technique of the present system and method that handles the transformations of such connector scenarios is now described.

Figure 12A:
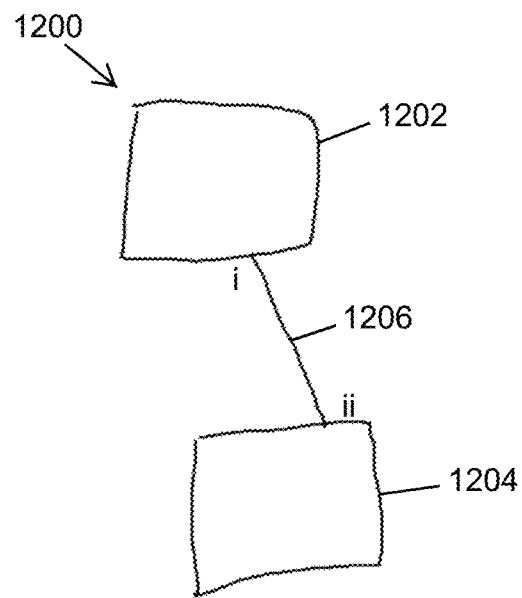
FIG. 12A shows an example hand-drawn diagram rendered in digital ink.
Figure 12B:
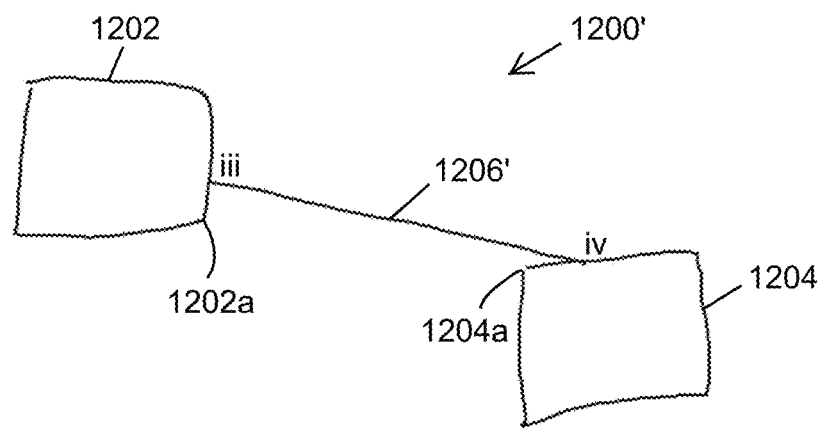
FIG. 12B shows a movement operation on a shape element of the diagram of FIG. 12A with example consequential effect on an associated connector.

FIG. 12 shows a movement operation on a digital ink box with example consequential effect on a digital ink connector associated therewith in a hand-drawn diagram 1200. In FIG. 12A, the diagram 1200 includes a box 1202 and a box 1204 connected by a connector 1206. In FIG. 12B, the box 1204 is moved relative to the box 1202 with consequential adjustment display of the connector as an adjusted connector 1206'. As can be seen, connection points i and ii of the connector 1206 to the boxes 1202 and 1024, respectively, are adjusted to connection points iii and iv for the adjusted connector 1206' about corners 1202a and 1204a, respectively, similar to FIG. 11. However, unlike the connector in the example diagram 1100 of FIG. 11, the connector 1206 of the diagram 1200 does not have connection points that are centered on the boundaries of the boxes 1202 and 1204 and therefore is not directly anchored to the centers of geometry of the boxes. Despite this the adjusted display of the connector appears natural and respectful to the intended edit to the diagram 1200 by the user. The manner in which the connection points of the non-centered connector are successfully adjusted during the movement operation is explained with reference to FIG. 13 which shows the movement operation of FIG. 12 in typeset form of the diagram 1200. The typesetted version of the diagrams herein is used for purposes of clarity of description only, and the following described techniques are also applicable to the digital ink versions.

Figure 13A:
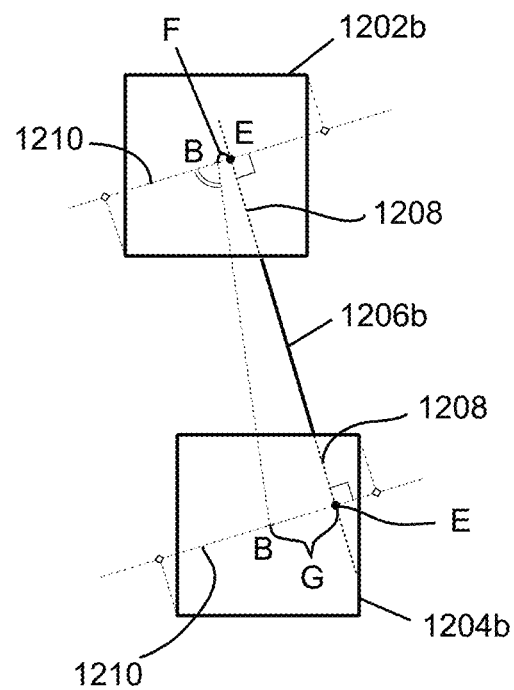
FIGS. 13A and 13B respectively show the diagrams of FIG. 12A and 12B rendered in typeset ink.
Figure 13B:
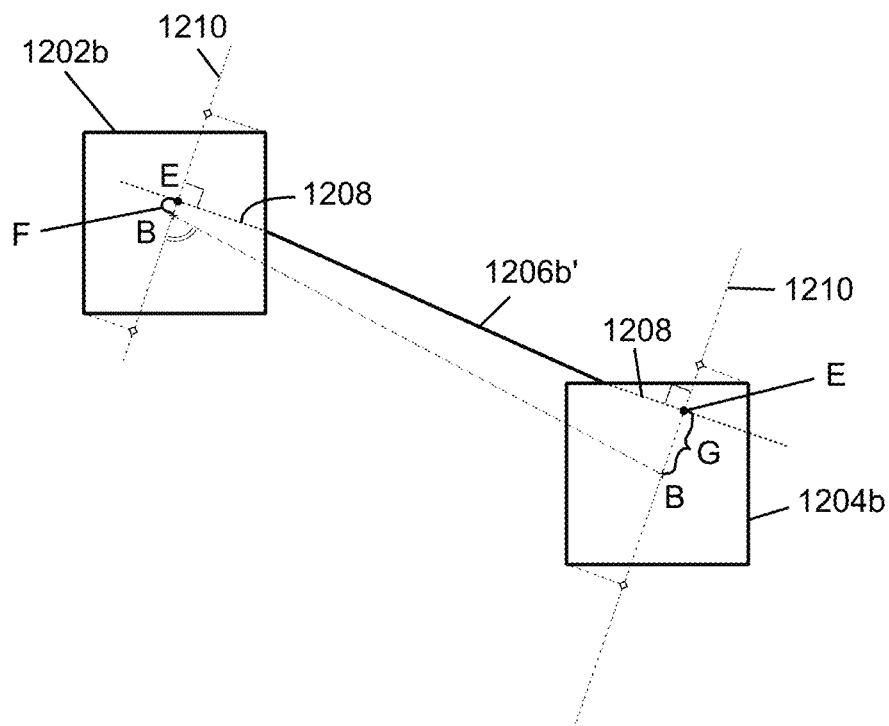

In FIG. 13A, the box 1202 is displayed as a typeset box 1202b, the box 1204 is displayed as a typeset box 1204b, and the connector 1206 is displayed as a typeset connector 1206b and in FIG. 13B the adjusted connector 1206' is displayed as a typeset connector 1206b'. FIG. 13A shows geometrical features of the relationships of the diagram elements which are determined and used by the present system and method for connection point adjustment. These features include the centers of geometry B of the boxes 1202 and 1204, an extension (dashed) line 1208 of the connector 1206 into the boxes from either end of the connector 1206, (dashed) lines 1210 which are normal to the extension line 1208 through the center of geometry of each box, thereby forming the extension line as a connection path from points E on the normal lines 1210, which are parallel to one another. It is noted that the depicted marks for the centers of geometry and relationship lines are provided in the drawings for illustrative purposes only, and are not typically displayed to users by the application 112. However, the UI of the application 112 may provide users with the ability to display such markings for reference, for example during editing operations.

In FIG. 13B, these markings are shown in relation to the adjusted display of the diagram 1200. As can be seen, the adjusted connector 1206b' is rendered on the connection path 1208 as it is adjusted due to the move of the box 1204. In this adjustment, the normal lines 1210 are maintained as passing through the centers of geometry B but are rotated in correspondence with the new relative x- and y-positions of the boxes 1202 and 1204. The points E are retained on the normal lines 1210 through this rotation, as are distances F and G between the points E and the centers of geometry B respectively for the boxes 1202 and 1204.

Accordingly, by the technique of the example of FIGS. 12 and 13, connection paths for non-centered connectors are determined which are offset from the centers of geometry of the connected objects, and therefore adjustment of the connection point positions is indirectly made with respect to the centers of geometry. The geometrical features used for this translation technique are suitable for the single connector example of FIGS. 12 and 13. However, situations involving multiple-connectors may require additional or different geometrical features to be considered.

Figure 14A:
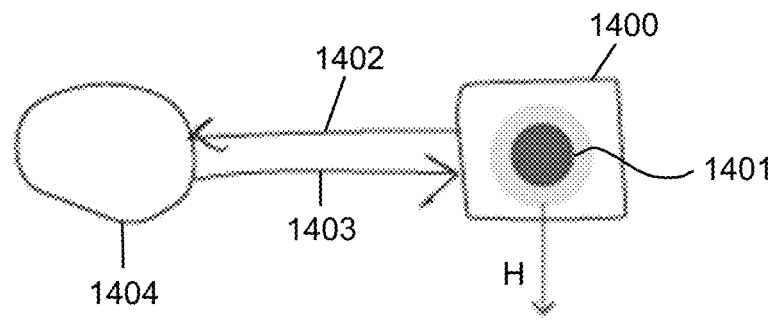
FIGS. 14A and 14B respectively show an example hand-drawn diagram before and after a movement operation on a shape element connected to another shape element with parallel connectors.
Figure 14B:
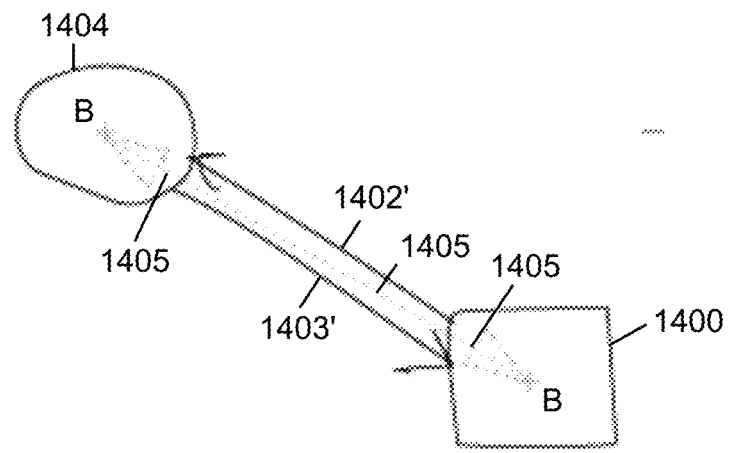

FIG. 14 shows a movement operation on a digital ink box with example consequential effect on parallel digital ink connectors associated therewith in a hand-drawn diagram. In FIG. 14A, a box 1400 is selected in response to detection of a selection gesture 1401 and moved in the direction of arrow H. The box has two associated connectors, a first connector 1402 and a second connector 1403, both of which have substantially straight geometry and are substantially parallel to one another. The adjusted display at the completion of the movement operation is shown in FIG. 14B, in which the connectors 1402 and 1403 are displayed as adjusted connectors 1402' and 1403'. The connectors 1402 and 1403, which are displayed substantially horizontal in FIG. 14A are adjusted to be lengthened and displayed at a slanted angle to the horizontal as the adjusted connectors 1402' and 1403' whilst retaining the substantially parallel alignment.

Unlike the example of FIG. 10, a path from the centers of geometry B of the box 1400 and the connected box 1404 does not flow through the parallel-aligned connectors 1402 and 1403. Accordingly, the substantially parallel-alignment of the connectors is respected in the movement operation by determining the common connection path of the parallel connectors which generally extends substantially parallel to the connectors substantially centrally there between. When the box 1400 is moved, the common connection path is adjusted to remain between the centers of geometry whist retaining the path geometry, for example, as shown in FIG. 14B, common connection path 1405 retains its straight geometry between the centers of geometry of the boxes 1400 and 1404 such that it becomes angled to the horizontal. The adjusted connectors 1402' and 1403' are rendered along the adjusted common connection path 1405 so as to retain the parallel separation therefrom of the original connectors 1402 and 1403.

Like the examples of FIGS. 10 and 11, the parallel connectors of FIG. 14 are substantially centered with respect to the connected objects and therefore, as discussed earlier, direct anchoring the centers of geometry, albeit through the construction of a common connection path thereto, is suitable. FIG. 15 shows a movement operation on a typeset ink box with example consequential effect on parallel typeset ink connectors associated therewith in a typeset hand-drawn diagram 1500.

Figure 15A:
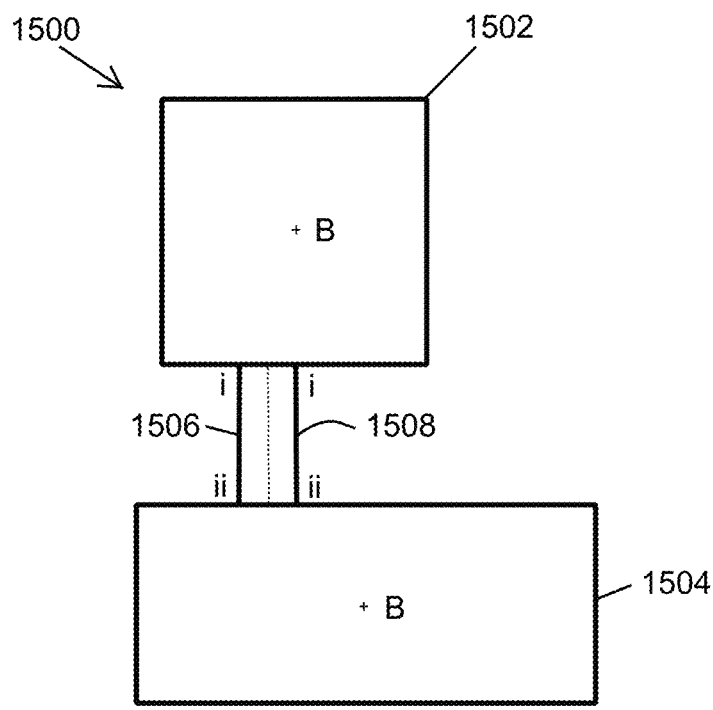
FIGS. 15A and 15B respectively show an example hand-drawn diagram before and after a movement operation on a shape element connected to another shape element with parallel connectors.
Figure 15B:
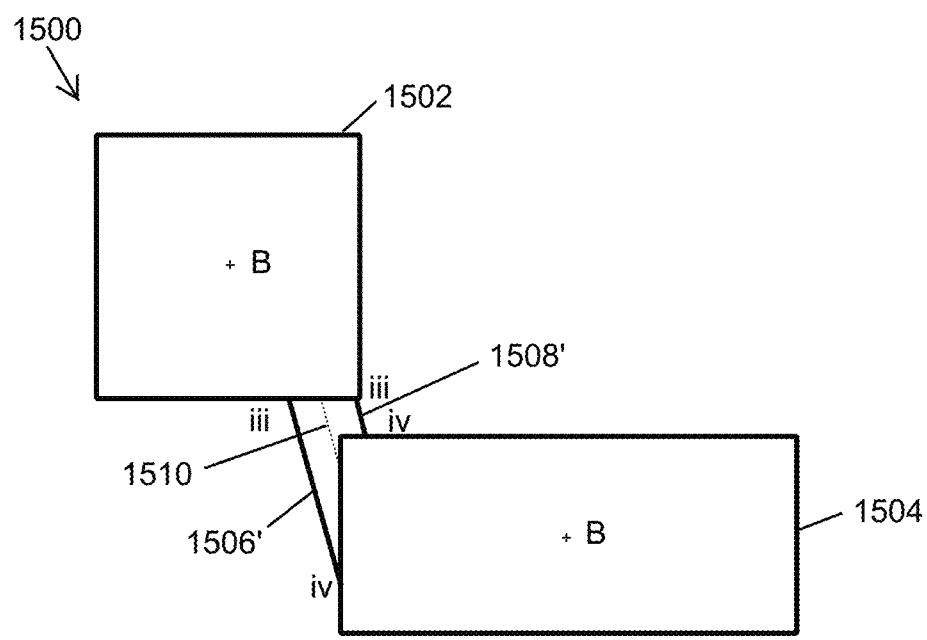

In FIG. 15A, typeset boxes 1502 and 1504 are connected by typeset parallel connectors 1506 and 1508, and in FIG. 15B, the box 1504 is moved relative to the box 1502 with consequential adjustment of the connectors as adjusted typeset connectors 1506' and 1508'. As can be seen, connection points i and ii of the parallel connectors 1506 and 1508 respectively to the boxes 1502 and 1504 are offset from the centers of geometry of the boxes. Like the example of FIG. 14, the application 112 determines a common connection path 1510 for the parallel connectors 1506 and 1508; however, this common path 1510 is offset from the centers of geometry B of the boxes 1502 and 1504 using the technique of FIGS. 12 and 13. Accordingly, the substantially parallel-alignment of the connectors is respected in the movement operation of the box 1504 as the common connection path 1510 is adjusted in accordance with the offset and the adjusted connectors 1506' and 1508' are rendered along this adjusted path so as to retain the parallel separation therefrom of the original connectors 1506 and 1508 and offset adjusted connection points iii and iv respectively to the boxes 1502 and 1504.

Figure 16A:
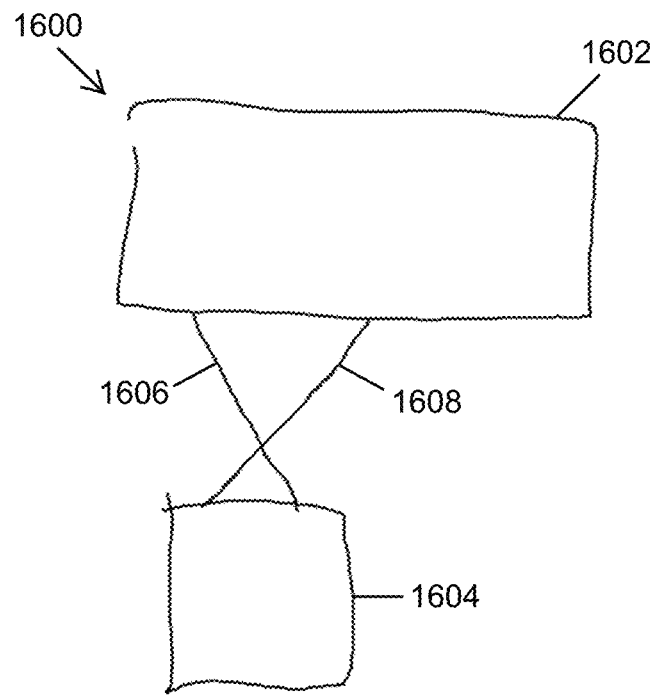
FIG. 16A shows an example hand-drawn diagram rendered in digital ink.
Figure 16B:
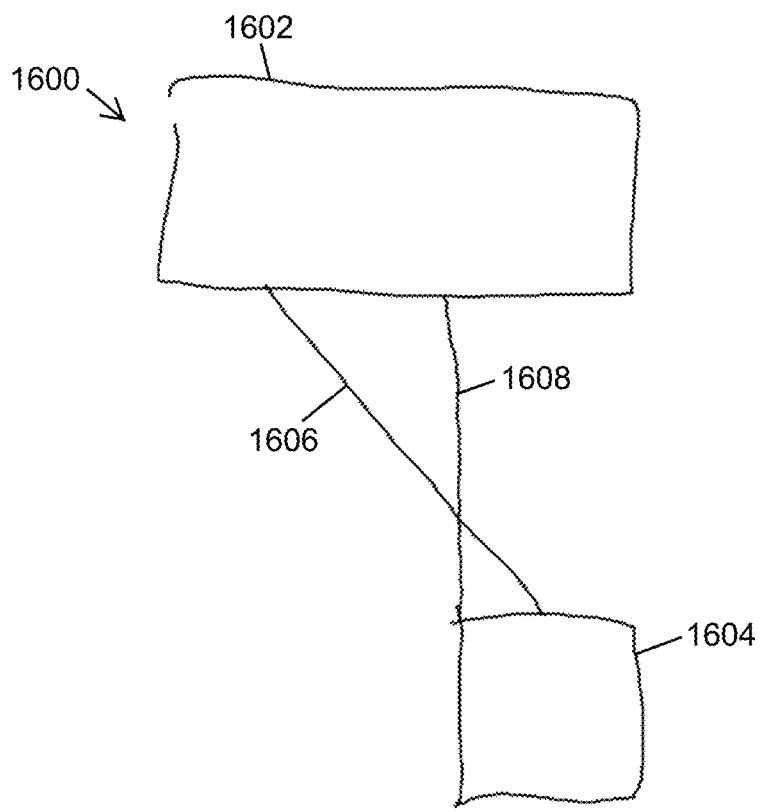
FIG. 16B shows a movement operation on a shape element of the diagram of FIG. 16A with example consequential effect on associated crossed-over connectors.
Figure 16C:
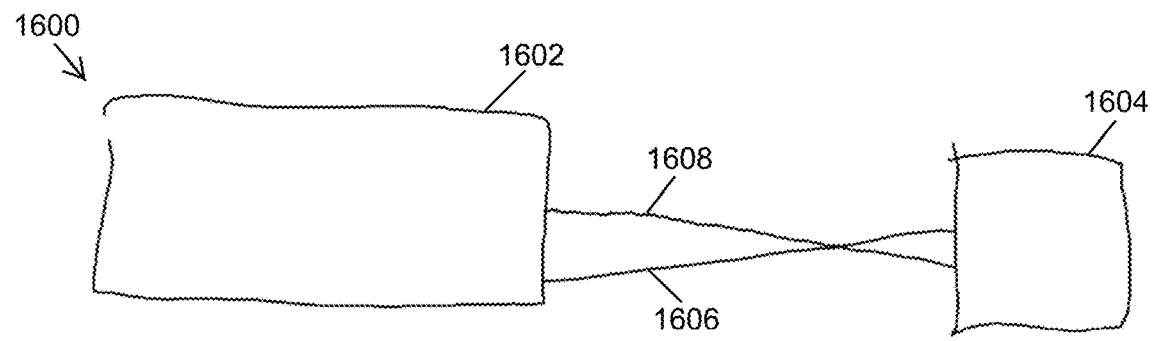
FIG. 16C shows a further movement operation on the shape element of the diagram of FIG. 16B with example consequential effect on the connectors.

More complex multiple-connector scenarios are also handled by adapting the afore-described adjustment techniques. FIG. 16 shows movement operations on a digital ink box with example consequential effect on digital ink connectors associated therewith in a hand-drawn diagram 1600 and FIG. 17 shows these movement operations in typeset form of the diagram 1600. In FIG. 16A, the diagram 1600 includes boxes 1602 and 1604 connected by connectors 1606 and 1608. As can be seen, the connectors 1606 and 1608 are not parallel as in the example diagram of FIG. 15, rather they crossover. In FIG. 16B, the box 1604 is moved relative to the box 1602 with consequential adjustment display of the connectors as adjusted connectors 1606' and 1608', which retain the crossover. In FIG. 16C, the box 1604 is moved further relative to the box 1602 with consequential adjustment display of the adjusted connectors as adjusted connectors 1606" and 1608", which also retain the crossover. The arrangement of the crossed connectors in the diagram 1600 is further complicated with respect to the full movement operation performed over FIGS. 16A to 16C, as is explained below with reference to FIG. 17 which shows the movement operation of FIG. 16 in typeset form of the diagram 1600.

Figure 17A:
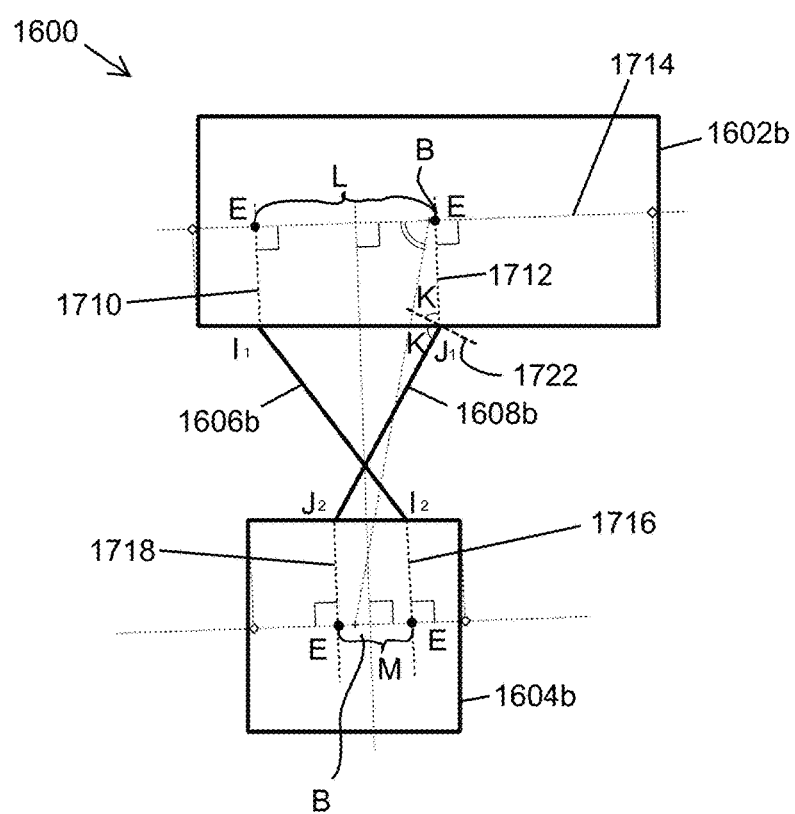
FIGS. 17A to 17C respectively show the diagrams of FIG. 16A to 16C rendered in typeset ink.
Figure 17B:
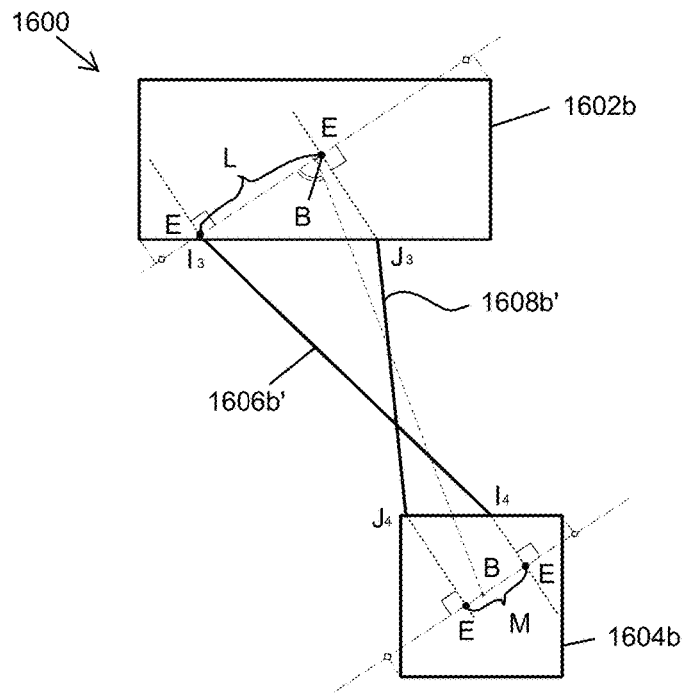
Figure 17C:
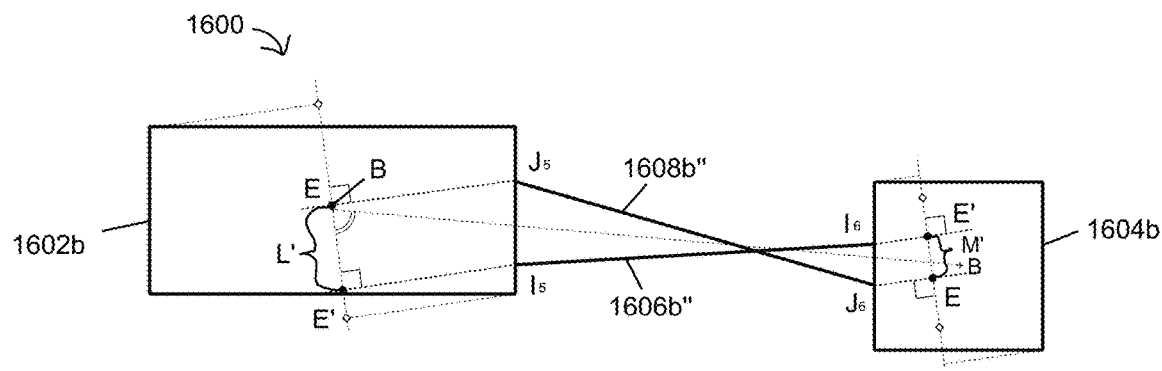

In FIG. 17A, the box 1602 is displayed as a typeset box 1602*b*, the box 1604 is displayed as a typeset box 1604*b*, the connector 1606 is displayed as a typeset connector 1606*b*, and the connector 1608 is displayed as a typeset connector 1608*b*. In FIG. 17B, the adjusted connector 1606' is displayed as a typeset connector 1606*b*' and the adjusted connector 1608' is displayed as a typeset connector 1608*b*'. In FIG. 17C, the adjusted connector 1606" is displayed as a typeset connector 1606*b*" and the adjusted connector 1608" is displayed as a typeset connector 1608*b*".

FIG. 17A shows geometrical features of the relationships of the diagram elements which are determined and used by the present system and method for connection point adjustment. These features include the centers of geometry B of the boxes 1602 and 1604, a (dashed) line 1710 of the connector 1606 which projects into the box 1602 from a connection point $I_1$ of the connector 1606 on the boundary of the box 1602, a (dashed) line 1712 of the connector 1608 which projects into the box 1602 from a connection point $J_1$ of the connector 1608 on the boundary of the box 1602 to be parallel to the projection line 1710, a (dashed) line 1714 which is normal to the parallel projection lines 1710 and 1712 and passes through the center of geometry B of the box 1602 and points E on the projection lines 1710 and 1712, a hang (dashed) line 1716 of the connector 1606 which projects into the box 1604 from a connection point $I_2$ of the connector 1606 on the boundary of the box 1604, a (dashed) line 1718 of the connector 1608 which projects into the box 1604 from a connection point $J_2$ of the connector 1608 on the boundary of the box 1604 to be parallel to the projection line 1716, a (dashed) line 1720 which is normal to the projection lines 1716 and 1718 and passes through the center of geometry B of the box 1604 and points E on the projection lines 1716 and 1718 so as to be parallel to the normal line 1714.

The orientation of projection lines, and therefore parallel normal lines, is determined based on the angle at which the connector connected closest to the center of geometry of a box connects to that box. The use of different criteria for setting the reference orientation is also possible, for example the (double) angle shown between the line (connection path) connecting the centers of geometry B and the line 1714. In the example of FIGS. 16 and 17, the connector 1606 is used as a reference since it is connected closest to the center of geometry of the box 1602. Accordingly, the angle K to the boundary of the box 1602 of the connector 1606, as shown in FIG. 17A, is used. Alternatively, the (double) angle is used, which disconnects these parameters from the shape of the box, which could be circular or a non-regular shape. The orientation of the projection line 1712 (and therefore the projection lines 1710, 1716 and 1718) is set at the same angle K but from a (dashed) line 1722 which is normal to the connector 1606 at the connection point $J_1$.

In FIG. 17B, the feature markings are shown in relation to the adjusted display of the diagram 1600. As can be seen, the adjusted connector 1606*b*' is rendered with connection points $I_3$ and $I_4$ to the boxes 1602 and 1604, respectively, and the adjusted connector 1608*b*' are rendered with connection points $J_3$ and $J_4$ to the boxes 1602 and 1604, respectively. In this adjustment, the normal lines 1714 and 1720 are maintained as passing through the centers of geometry B but are rotated in correspondence with the new relative x- and y-positions of the boxes 1602 and 1604. Through this rotation, the normal orientation of the projection lines 1710, 1712, 1716 and 1718 to the normal lines 1714 and 1720 are maintained as are distances L and M between the points E respectively in the boxes 1602 and 1604 as set as above, or through maintenance of the angle between the normal line 1714 and the connection path between the centers of geometry B.

In FIG. 17C, the feature markings are shown in relation to the adjusted display of the diagram 1600. As can be seen, the adjusted connector 1606*b*" is rendered with connection points $I_5$ and $I_6$ to the boxes 1602 and 1604, respectively, and the adjusted connector 1608*b*" is rendered with connection points $J_5$ and $J_6$ to the boxes 1602 and 1604, respectively. In this adjustment, the normal line 1714 is maintained as passing through the center of geometry B of the box 1602 and is rotated in correspondence with the new relative x- and y-positions of the boxes 1602 and 1604. However, in this rotation the point E of the projection line 1710 would be outside of the box 1602. Accordingly, the point E of the projection line 1710 is shifted to point E' on the normal line 1714 with consequential shortening of the distance L to distance L' between the points E and E' in the box 1602. The point E of the projection line 1716 at the other end of the connector 1606 is shifted by a proportional amount to point E' in order to maintain the relative geometries of the connectors 1606 and 1608. That is, the distance M is shortened to distance M' between the points E and E' in the box 1604. The proportionality of the shift is determined based on the relative dimensions of the boxes 1602 and 1604, for example, the widths of the boxes in the y-direction. It is noted that the normal line 1720 is not illustrated as through the center of geometry of the box 1604, however the same geometry would be obtained if it was since the normal lines 1714 and 1720 remain in parallel. Through this rotation, the normal orientation of the projection lines 1710, 1712, 1716 and 1718 to the normal lines 1714 and 1720 are maintained as set as above, or through maintenance of the angle between the normal line 1714 and the connection path between the centers of geometry B.

Accordingly, by the technique of the example of FIGS. 16 and 17, connection paths for non-centered and crossed connectors are determined which are offset from the centers of geometry of the connected objects, and therefore adjustment of the connection point positions is indirectly made with respect to the centers of geometry. Further, the connection points are shifted in accordance with this offset so as to keep the connectors sensibly connected to the objects, thereby allowing total free movement of the objects by users. Indeed, it is understood that the technique for the centered and non-centered connector cases is similar, where for the centered case the offset of the connection path, on which the connector(s) lies, is zero and for the non-centered cases the offset of the connection path, which is generated for the connector(s) with respect to the centers of geometry, is non-zero.

While the foregoing has described what is considered to be the best mode and/or other examples, it is understood that various modifications may be made therein and that the subject matter disclosed herein may be implemented in various forms and examples, and that they may be applied in numerous other applications, combinations, and environments, only some of which have been described herein. Those of ordinary skill in that art will recognize that the disclosed aspects may be altered or amended without departing from the true spirit and scope of the subject matter. Therefore, the subject matter is not limited to the specific details, exhibits, and illustrated examples in this description. It is intended to protect any and all modifications and variations that fall within the true scope of the advantageous concepts disclosed herein.

We claim:

1. A system for hand-drawing connections of diagrams including text and non-text elements on a computing device, the computing device comprising a processor and at least one non-transitory computer readable medium for detecting and recognizing hand-drawing diagram element input under control of the processor, the at least one non-transitory computer readable medium configured to:
    cause display of a plurality of input diagram elements in interactive ink on a display device associated with the computing device;
    identify at least one diagram element as a non-centered or a crossed connector which connects a plurality of diagram elements, each diagram element having a center of geometry, the non-centered or crossed connector defining a connection path which is offset from the centers of geometry of the connected diagram elements with a non-zero offset;
    determine at least one of a projection line, point, and direction associated with the at least one identified connector; and
    cause re-display of the diagram elements based on one or more interactions received with the interactive ink of the at least one identified non-centered or crossed connector or one or more of the plurality of diagram elements connected thereby and in accordance with the non-zero offset and the position of the determined at least one projection line, point, and direction, the position of the determined at least one projection line, point, and direction being updated when the diagram elements are re-displayed;
    wherein an orientation of the at least one of a projection line, point, and direction associated with the at least one identified connector is determined based on an angle formed by a reference connector, and wherein the reference connector is connected nearest to a center of geometry of the at least one diagram element of the plurality of diagram elements.

2. A system as claimed in claim 1, wherein the at least one connector is identified based on characteristics of the connector and positional relationships between the diagram elements.

3. A system as claimed in claim 1, wherein the at least one projection line, point, and direction associated with the at least one identified connector is related to a connection path between geometrical features of the connected diagram elements.

4. A system as claimed in claim 3, wherein the center of geometry is one of the geometrical features of the connected diagram elements.

5. A system as claimed in claim 4, the at least one non-transitory computer readable medium being configured to determine the at least one projection line, point, and direction associated with the at least one identified connector to include a relationship between points of connection of the at least one connector with the connected diagram elements.

6. A system as claimed in claim 5, wherein the connection path is offset from the centers of geometry of the connected diagram elements based on the points of connection.

7. A system as claimed claim 1, wherein the interactive ink is digital ink.

8. A method for hand-drawing diagrams including text and non-text elements on a computing device, the computing device comprising a processor and at least one non-transitory computer readable medium for detecting and recognizing hand-drawing diagram element input under control of the processor, the method comprising:
    displaying a plurality of input diagram elements in interactive ink on a display device associated with the computing device;
    identifying at least one diagram element as a non-centered or a crossed connector which connects a plurality of diagram elements, each diagram element having a center of geometry, the non-centered or crossed connector defining a connection path which is offset from the centers of geometry of the connected diagram elements with a non-zero offset;
    determining at least one of a projection line, point, and direction associated with the at least one identified; and
    re-displaying the diagram elements based on one or more interactions received with the interactive ink of the at least one identified non-centered or crossed connector or one or more of the plurality of diagram elements connected thereby and in accordance with the non-zero offset and the position of the determined at least one projection line, point, and direction, the position of the determined at least one projection line, point, and direction being updated when the diagram elements are re-displayed;
    wherein an orientation of the at least one of a projection line, point, and direction associated with the at least one identified connector is determined based on an angle formed by a reference connector, and wherein the reference connector is connected nearest to a center of geometry of the at least one diagram element of the plurality of diagram elements.

9. A method as claimed in claim 8, comprising identifying the at least one connector based on characteristics of the connector and positional relationships between the diagram elements.

10. A method as claimed in claim 8, wherein the at least one projection line, point, and direction associated with the at least one identified connector is related to a connection path between geometrical features of the connected diagram elements.

11. A method as claimed in claim 10, wherein the center of geometry is one of the geometrical features of the connected diagram elements.

12. A method as claimed in claim 11, wherein the at least one projection line, point, and direction associated with the at least one identified connector are determined to include a relationship between points of connection of the at least one connector with the connected diagram elements.

13. A method as claimed in claim 12, wherein the connection path is offset from the centers of geometry of the connected diagram elements based on the points of connection.

14. A method as claimed claim 8, wherein the interactive ink is digital ink.

15. A non-transitory computer readable medium having a computer readable program code embodied therein, said computer readable program code adapted to be executed to implement a method for hand-drawing diagrams including text and non-text elements on a computing device, the computing device comprising a processor and at least one non-transitory computer readable medium for detecting and recognizing hand-drawing diagram element input under control of the processor, the method comprising:
- displaying a plurality of input diagram elements in interactive ink on a display device associated with the computing device;
- identifying at least one diagram element as a non-centered or a crossed connector which connects a plurality of diagram elements, each diagram element having a center of geometry, the non-centered or crossed connector defining a connection path which is offset from the centers of geometry of the connected diagram elements with a non-zero offset;
- determining at least one of a projection line, point, and direction associated with the at least one identified connector; and
- re-displaying the diagram elements based on one or more interactions received with the interactive ink of the at least one identified non-centered or crossed connector or one or more of the plurality of diagram elements connected thereby and in accordance with the non-zero offset and the position of the determined at least one projection line, point, and direction, the position of the determined at least one projection line, point, and direction being updated when the diagram elements are re-displayed;
- wherein an orientation of the at least one of a projection line, point, and direction associated with the at least one identified connector is determined based on an angle formed by a reference connector, and wherein the reference connector is connected nearest to a center of geometry of the at least one diagram element of the plurality of diagram elements.

16. A non-transitory computer readable medium as claimed in claim 15, comprising identifying the at least one connector based on characteristics of the connector and positional relationships between the diagram elements.

17. A non-transitory computer readable medium as claimed in claim 15, wherein at least one projection line, point, and direction associated with the at least one identified connector include a connection path between the geometrical features of the connected diagram elements.

18. A non-transitory computer readable medium as claimed in claim 17, wherein the center of geometry is one of the geometrical features of the connected diagram elements.

19. A non-transitory computer readable medium as claimed in claim 18, wherein the at least one projection line, point, and direction associated with the at least one identified connector are determined to include a relationship between points of connection of the at least one connector with the connected diagram elements.

20. A non-transitory computer readable medium as claimed in claim 19, wherein the connection path is offset from the centers of geometry of the connected diagram elements based on the points of connection.

21. A non-transitory computer readable medium as claimed claim 15, wherein the interactive ink is digital ink.

* * * * *